(12) United States Patent
Blaisdell et al.

(10) Patent No.: US 8,915,064 B2
(45) Date of Patent: Dec. 23, 2014

(54) EXHAUST GAS FLOW DEVICE

(75) Inventors: Jared Dean Blaisdell, Blaine, MN (US); Karthik Viswanathan, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 765 days.

(21) Appl. No.: 12/120,689

(22) Filed: May 15, 2008

(65) Prior Publication Data

US 2009/0000287 A1 Jan. 1, 2009

Related U.S. Application Data

(60) Provisional application No. 60/938,067, filed on May 15, 2007, provisional application No. 60/977,518, filed on Oct. 4, 2007, provisional application No. 61/024,677, filed on Jan. 30, 2008.

(51) Int. Cl.

| | | |
|---|---|---|
| *F01N 3/24* | (2006.01) | |
| *F01N 3/28* | (2006.01) | |
| *B01F 3/04* | (2006.01) | |
| *B01F 5/06* | (2006.01) | |
| *F01N 3/035* | (2006.01) | |
| *F01N 3/20* | (2006.01) | |
| *F01N 13/00* | (2010.01) | |
| *B01F 5/00* | (2006.01) | |

(52) U.S. Cl.
CPC .......... *F01N 3/2892* (2013.01); *B01F 3/04049* (2013.01); *B01F 5/0644* (2013.01); *F01N 3/035* (2013.01); *F01N 3/2066* (2013.01); *F01N 13/0097* (2014.06); *F01N 13/0093* (2013.01); *B01F 2005/0017* (2013.01); *F01N 2240/20* (2013.01); *F01N 2610/02* (2013.01); *Y02T 10/24* (2013.01)

USPC .................................. 60/295; 60/301; 60/324

(58) Field of Classification Search
USPC ............. 60/324, 295, 301, 303; 366/336–340
See application file for complete search history.

(56) References Cited

U.S. PATENT DOCUMENTS

| | | |
|---|---|---|
| 2,561,457 A | 7/1951 | Beales et al. |
| 2,898,202 A | 8/1959 | Houdry et al. |

(Continued)

FOREIGN PATENT DOCUMENTS

| | | |
|---|---|---|
| DE | 42 03 807 A1 | 8/1993 |
| DE | 199 55 013 A1 | 5/2001 |

(Continued)

OTHER PUBLICATIONS

International Search Report and Written Opinion mailed Nov. 25, 2008.

(Continued)

*Primary Examiner* — Kenneth Bomberg
*Assistant Examiner* — Jonathan Matthias
(74) *Attorney, Agent, or Firm* — Merchant & Gould P.C.

(57) ABSTRACT

A flow device for an exhaust treatment system includes a base and at least one flow deflector tube secured to the base. The flow deflector tube includes a flow inlet, a flow outlet, and a passage that extends through the flow deflector tube from the flow inlet to the flow outlet. The flow outlet is at an angled orientation to the flow inlet. A method of mixing reactants and exhaust in an exhaust treatment system includes the steps of injecting reactants into exhaust gases flowing through an exhaust conduit used to convey the exhaust gases from an engine. Bent tubes are disposed in the exhaust conduit and used to mix the exhaust gases and the reactants.

29 Claims, 27 Drawing Sheets

(56) References Cited

U.S. PATENT DOCUMENTS

| | | | |
|---|---|---|---|
| 2,946,651 A | 7/1960 | Houdry et al. | |
| 3,048,376 A | 8/1962 | Howald | |
| 3,072,457 A | 1/1963 | Bloch | |
| 3,779,335 A * | 12/1973 | Chelminski | 181/119 |
| 3,863,678 A | 2/1975 | Pettersson et al. | |
| 3,867,508 A | 2/1975 | Hass | |
| 3,964,875 A | 6/1976 | Chang | |
| 4,498,786 A | 2/1985 | Ruscheweyh | |
| 4,902,487 A | 2/1990 | Cooper et al. | |
| 4,916,897 A | 4/1990 | Hayashi et al. | |
| 4,955,183 A * | 9/1990 | Kolodzie et al. | 60/303 |
| 5,138,834 A | 8/1992 | Maund | |
| 5,272,871 A | 12/1993 | Oshima et al. | |
| 5,315,824 A | 5/1994 | Takeshima | |
| 5,489,153 A | 2/1996 | Berner et al. | |
| 5,540,897 A | 7/1996 | Chu et al. | |
| 5,662,869 A | 9/1997 | Abe et al. | |
| 5,693,299 A | 12/1997 | Chopin et al. | |
| 5,701,735 A | 12/1997 | Kawaguchi | |
| 5,772,972 A | 6/1998 | Hepburn et al. | |
| 5,884,474 A | 3/1999 | Topsøe | |
| 5,916,134 A | 6/1999 | Yang et al. | |
| 5,941,069 A | 8/1999 | Heath | |
| 5,992,141 A | 11/1999 | Berriman | |
| 6,041,594 A | 3/2000 | Brenner | |
| 6,050,088 A | 4/2000 | Brenner | |
| 6,192,677 B1 | 2/2001 | Tost | |
| 6,199,375 B1 | 3/2001 | Russell | |
| 6,294,141 B1 | 9/2001 | Twigg et al. | |
| 6,314,722 B1 | 11/2001 | Matros et al. | |
| 6,401,449 B1 | 6/2002 | Hofmann | |
| 6,442,933 B2 | 9/2002 | Rusch | |
| 6,444,177 B1 | 9/2002 | Müller et al. | |
| 6,449,947 B1 | 9/2002 | Liu et al. | |
| 6,539,708 B1 | 4/2003 | Hofmann et al. | |
| 6,546,717 B1 | 4/2003 | Chandler et al. | |
| 6,606,854 B1 | 8/2003 | Siefker | |
| 6,680,037 B1 | 1/2004 | Allansson et al. | |
| 6,689,327 B1 | 2/2004 | Reck | |
| 6,712,869 B2 | 3/2004 | Cheng | |
| 6,722,123 B2 | 4/2004 | Liu | |
| 6,722,124 B2 | 4/2004 | Pawson et al. | |
| 6,770,252 B2 | 8/2004 | Cheng | |
| 6,863,874 B1 | 3/2005 | Twigg | |
| 7,104,251 B2 | 9/2006 | Kim | |
| 7,168,241 B2 | 1/2007 | Rudelt et al. | |
| 7,448,206 B2 | 11/2008 | Meingast et al. | |
| 2002/0162322 A1 | 11/2002 | Ganzmann et al. | |
| 2003/0003029 A1 | 1/2003 | Rogers et al. | |
| 2003/0079467 A1 | 5/2003 | Liu et al. | |
| 2003/0108457 A1 | 6/2003 | Gault et al. | |
| 2003/0226539 A1 | 12/2003 | Kim | |
| 2004/0237511 A1 | 12/2004 | Ripper et al. | |
| 2005/0013756 A1 * | 1/2005 | Amou et al. | 423/239.1 |
| 2006/0035183 A1 * | 2/2006 | Carroni et al. | 431/7 |
| 2006/0053773 A1 * | 3/2006 | Mayer et al. | 60/286 |
| 2007/0101703 A1 * | 5/2007 | Kanaya et al. | 60/286 |
| 2007/0144158 A1 | 6/2007 | Girard | |
| 2007/0189936 A1 | 8/2007 | Suwabe et al. | |
| 2007/0261395 A1 * | 11/2007 | Mahnken et al. | 60/297 |
| 2007/0274877 A1 | 11/2007 | Bush et al. | |
| 2008/0041052 A1 | 2/2008 | Doring et al. | |
| 2008/0245060 A1 | 10/2008 | Stieglbauer | |
| 2009/0019843 A1 | 1/2009 | Levin et al. | |
| 2009/0205327 A1 | 8/2009 | Kabat et al. | |
| 2010/0107612 A1 | 5/2010 | Yamazaki et al. | |
| 2011/0167810 A1 | 7/2011 | Lebas et al. | |

FOREIGN PATENT DOCUMENTS

| | | |
|---|---|---|
| DE | 20 2006 011281 | 9/2006 |
| DE | 10 2007 009890 | 9/2008 |
| DE | 10 2007 0012790 | 9/2008 |
| DE | 10 2008 031136 | 1/2010 |
| EP | 0319299 | 6/1989 |
| EP | 0 555 746 A1 | 8/1993 |
| EP | 0628706 | 12/1994 |
| EP | 0666099 | 8/1995 |
| EP | 0758713 | 2/1997 |
| EP | 0839996 | 5/1998 |
| EP | 0849441 | 6/1998 |
| EP | 0862941 | 9/1998 |
| EP | 1 054 722 | 11/2000 |
| EP | 0 779 415 B1 | 5/2001 |
| EP | 1 262 644 | 12/2002 |
| EP | 1 109 993 | 5/2003 |
| EP | 1 109 993 B1 | 5/2003 |
| EP | 1 054 139 B1 | 3/2004 |
| EP | 1 712 753 A2 | 10/2006 |
| EP | 1 770 253 A1 | 4/2007 |
| EP | 1 890 016 A2 | 2/2008 |
| EP | 1947307 | 7/2008 |
| EP | 1 953 359 | 8/2008 |
| EP | 1 712 756 B1 | 3/2009 |
| EP | 2168672 | 3/2010 |
| FR | 2 384 206 | 10/1978 |
| GB | 2 381 218 A | 4/2003 |
| GB | 2 434 557 A | 8/2007 |
| JP | 11-166410 | 6/1999 |
| JP | 2000199423 A * | 7/2000 | F01N 3/08 |
| JP | 2002213233 A * | 7/2002 | F01N 3/08 |
| JP | 2003193823 A * | 7/2003 | F01N 3/02 |
| JP | 2003232218 A * | 8/2003 | F01N 3/24 |
| JP | 2005127271 A * | 5/2005 | F01N 3/08 |
| JP | 2005-273564 | 10/2005 |
| JP | 2006-105414 | 4/2006 |
| JP | 2006183509 A * | 7/2006 |
| JP | 2006-205077 | 8/2006 |
| JP | 2007239486 A * | 9/2007 |
| JP | 2008-128093 | 6/2008 |
| JP | 2008-309000 | 12/2008 |
| WO | WO 97/01387 | 1/1997 |
| WO | WO 99/44725 | 9/1999 |
| WO | WO 01/04466 A1 | 1/2001 |
| WO | WO 01/42630 | 6/2001 |
| WO | WO 03/004839 A1 | 1/2003 |
| WO | WO 03/036056 A1 | 5/2003 |
| WO | 03-104624 | 12/2003 |
| WO | WO 2004/033866 A1 | 4/2004 |
| WO | WO 2004/038192 | 5/2004 |
| WO | WO 2004/113690 | 12/2004 |
| WO | WO 2004/113690 A1 | 12/2004 |
| WO | WO 2005/073524 A1 | 8/2005 |
| WO | WO 2006009056 A1 * | 1/2006 |
| WO | WO 2006/010922 | 2/2006 |
| WO | WO 2007/127529 | 11/2007 |
| WO | WO 2008/061734 A1 | 5/2008 |
| WO | WO 2008/111254 | 9/2008 |
| WO | WO 2009/012885 | 1/2009 |
| WO | WO 2009/157995 | 12/2009 |
| WO | WO 2010/032077 | 3/2010 |

OTHER PUBLICATIONS

Jungmin Seo, "Aftertreatment Package Design for SCR Performance Optimization" Apr. 12, 2011, *SAE International*, 7 pages.

Alano et al., "Compact SCR for Passenger Cars" Apr. 12, 2011. *SAE International*, 9 pages.

Akiyoshi et al., "Development of Efficient Urea-SCR Systems for EPA 2010-Compliant Medium Duty Diesel Vehicles" Apr. 12, 2011, *SAE International*, 8 pages.

European Search Report for Application No. 12186149.6 mailed Dec. 19, 2012.

Machine Translation of JP 2003-193823 (previously submitted), 10 pages.

Machine Translation of JP 2008-3090000 (previously submitted), 20 pages.

Machine Translation of JP 11166410 (previously submitted), 13 pages.

Machine Translation of DE 102007012790A1 (previously submitted), 13 pages.

* cited by examiner

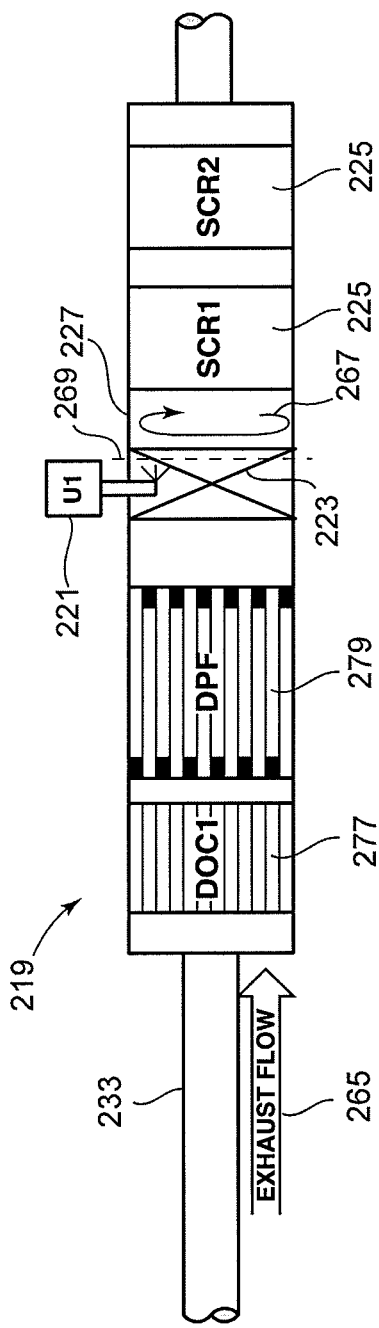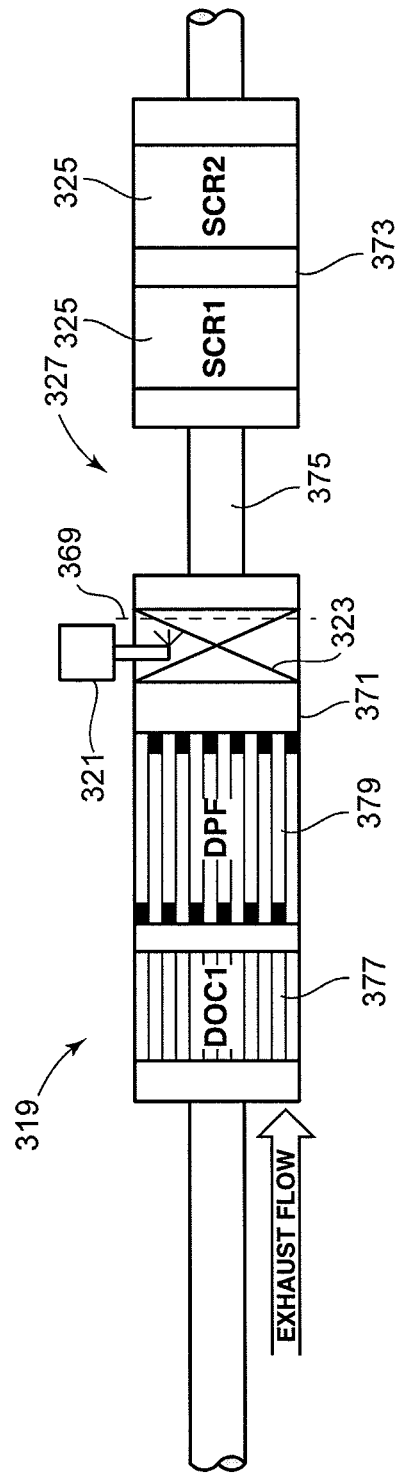

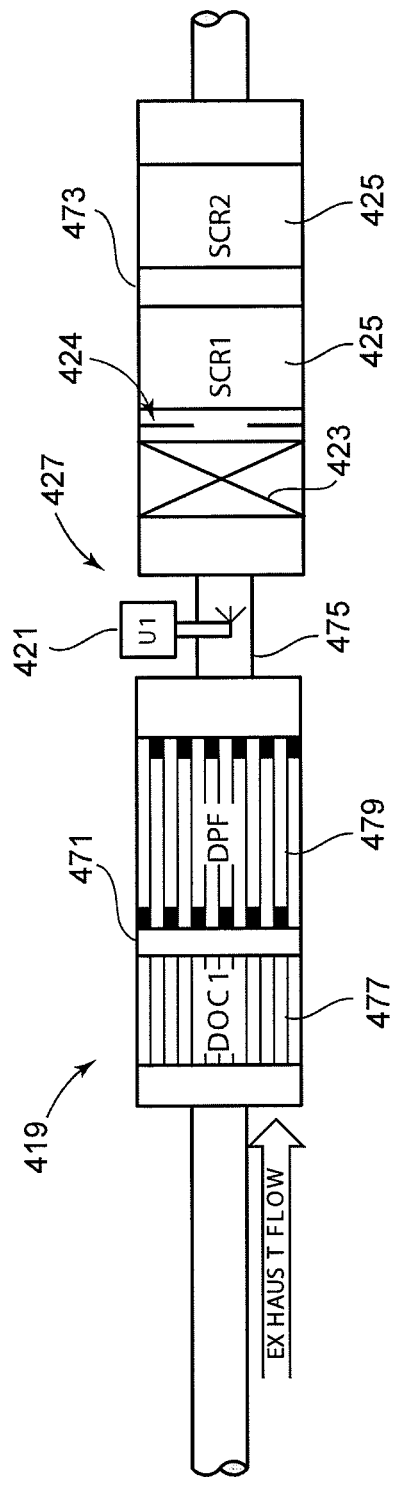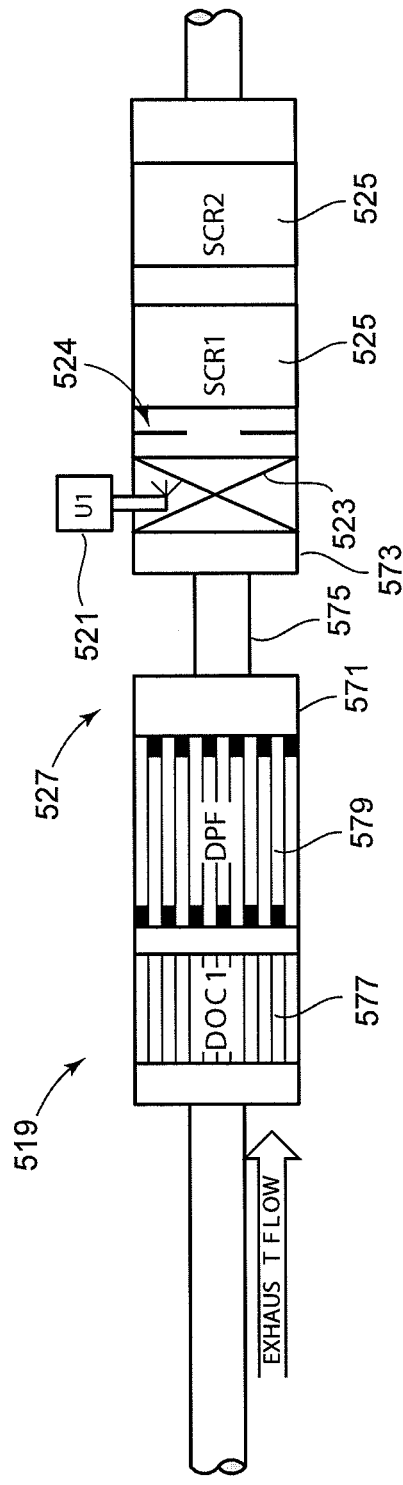
FIG. 12
FIG. 13

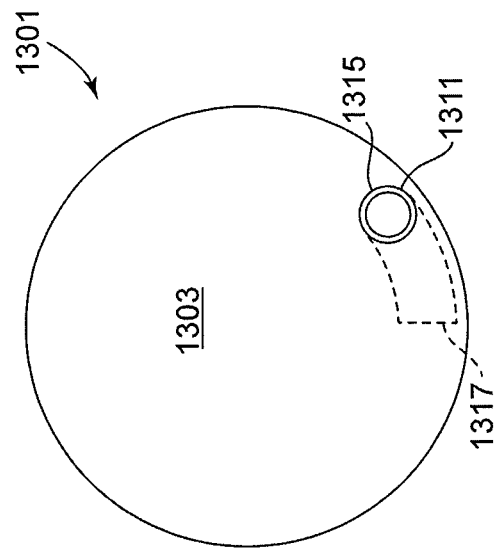
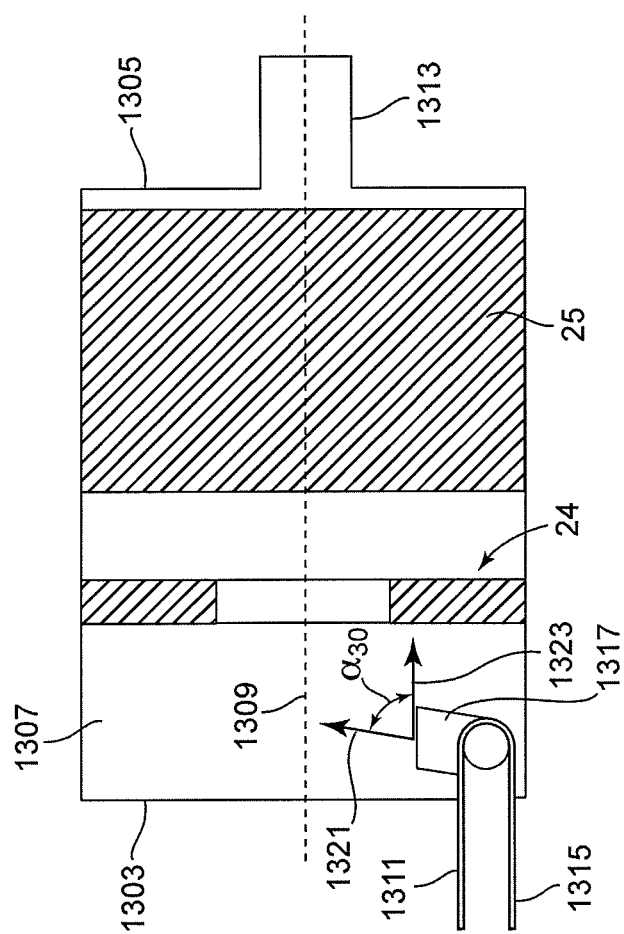

EXHAUST GAS FLOW DEVICE

CROSS-REFERENCE TO RELATED APPLICATION

This application claims the benefit of U.S. Provisional Patent Application Ser. Nos. 60/938,067, filed May 15, 2007; 60/977,518, filed Oct. 4, 2007; and 61/024,677, filed on Jan. 30, 2008, all of which are hereby incorporated by reference in their entirety.

BACKGROUND

Vehicles equipped with diesel engines typically include exhaust systems that have aftertreatment systems such as selective catalytic reduction catalyst devices, lean NOx catalyst devices, or lean NOx trap devices to reduce the amount of undesirable gases, such as nitrogen oxides (NOx) from the exhaust. In order for these types of aftertreatment devices to work properly, a doser injects reactants, such as urea, ammonia, or hydrocarbons, into the exhaust gas. As the exhaust gas and reactants flow through the aftertreatment device, the exhaust gas and reactants convert the undesirable gases, such as NOx, into more acceptable gases, such as nitrogen and oxygen. However, the efficiency of the aftertreatment system depends upon how evenly the reactants are mixed with the exhaust gases. Therefore, there is a need for a flow device that provides a uniform mixture of exhaust gases and reactants.

SUMMARY

An aspect of the present disclosure relates to a flow device for an exhaust treatment system that uses at least one bent tube for mixing exhaust flow within an exhaust conduit. In certain embodiments, the flow device can include a catalyst for catalyzing the decomposition of reactant injected into the exhaust treatment system.

Another aspect of the present disclosure relates to a flow device for an exhaust treatment system having a base and at least one flow deflector tube secured to the base. The flow deflector tube includes a flow inlet, a flow outlet, and a passage that extends through the flow deflector tube from the flow inlet to the flow outlet. The flow outlet is at an angled orientation to the flow inlet.

Another aspect of the present disclosure relates to an exhaust treatment system having an exhaust conduit for conveying exhaust gases from an engine of a vehicle. An aftertreatment device is disposed in the exhaust conduit. A flow device is disposed in the exhaust conduit upstream of the aftertreatment device. The flow device includes a base and a plurality of flow deflector tubes secured to the base. Each flow deflector tube includes a flow inlet, a flow outlet and a passage that extends through the flow deflector tube from the flow inlet to the flow outlet. The flow outlet is at an angled orientation to the flow inlet.

Another aspect of the present disclosure relates to a method of mixing reactants and exhaust in an exhaust treatment system. The method includes the steps of injecting reactants into exhaust gases flowing through an exhaust conduit used to convey the exhaust gases from an engine. Bent tubes are disposed in the exhaust conduit and used to mix the exhaust gases and the reactants.

Another aspect of the present disclosure relates to an exhaust treatment system having an exhaust conduit for conveying exhaust gases from an engine of a vehicle, an aftertreatment device disposed in the exhaust conduit and a flow device disposed upstream of the aftertreatment device. The flow device includes an inlet and an outlet and defines an exhaust flow redirection angle measure between the inlet and the outlet. The exhaust flow redirection angle redirects exhaust flow through the flow device such that the exhaust flow swirls about a longitudinal axis of the flow device. The exhaust flow redirection angle is about 45 degrees to about 135 degrees.

Another aspect of the present disclosure relates to a method of mixing exhaust in an exhaust treatment system. The method including injecting reactants into exhaust gases flowing through an exhaust conduit used to convey the exhaust gases from an engine. The method further including redirecting the exhaust gases through a flow device. The flow device having an exhaust redirection angle that causes the exhaust gases and the reactants to swirl about a longitudinal axis of the exhaust conduit. The exhaust redirection angle is about 45 degrees to about 135 degrees.

Another aspect of the present disclosure relates to a flow device for an exhaust treatment system. The flow device includes a base and a plurality of flow deflectors disposed on the base. The flow deflectors define an exhaust redirection angle as measured between an exhaust inlet and an exhaust outlet of the flow device that is less than or equal to about 135 degrees.

Another aspect of the present disclosure relates to a housing assembly for an exhaust treatment system. The housing assembly includes a main body defining an inner cavity. An aftertreatment device is disposed in the inner cavity. A flow device is adapted to direct exhaust flow circumferentially about a longitudinal axis of the main body such that the exhaust flow exits the flow device at a swirl angle in the range of about 45 degrees to about 135 degrees.

Another aspect of the present disclosure relates to an exhaust treatment system. The exhaust treatment system includes an exhaust conduit that is adapted to convey exhaust gases from an engine, a doser that is adapted to inject reactants into the exhaust gases, a flow device and a diameter restriction. The flow device defines an exhaust redirection angle that causes the exhaust gases and the reactants to swirl about a longitudinal axis of the exhaust conduit. The diameter restriction is adapted to reduce the amount of unvaporized or unhydrolyzed reactants at the aftertreatment device.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 10 is a schematic representation of an alternate embodiment of the exhaust treatment system of FIG. 1.

FIG. 11 is a schematic representation of an alternate embodiment of the exhaust treatment system of FIG. 1.

FIG. 12 is a schematic representation of an alternate embodiment of the exhaust treatment system of FIG. 1.

FIG. 13 is a schematic representation of an alternate embodiment of the exhaust treatment system of FIG. 1.

FIG. 30 is a front view of an alternate embodiment of a housing assembly suitable for use with the engine exhaust system of FIG. 1.

FIG. 31 is a left side view of the housing assembly of FIG. 30.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
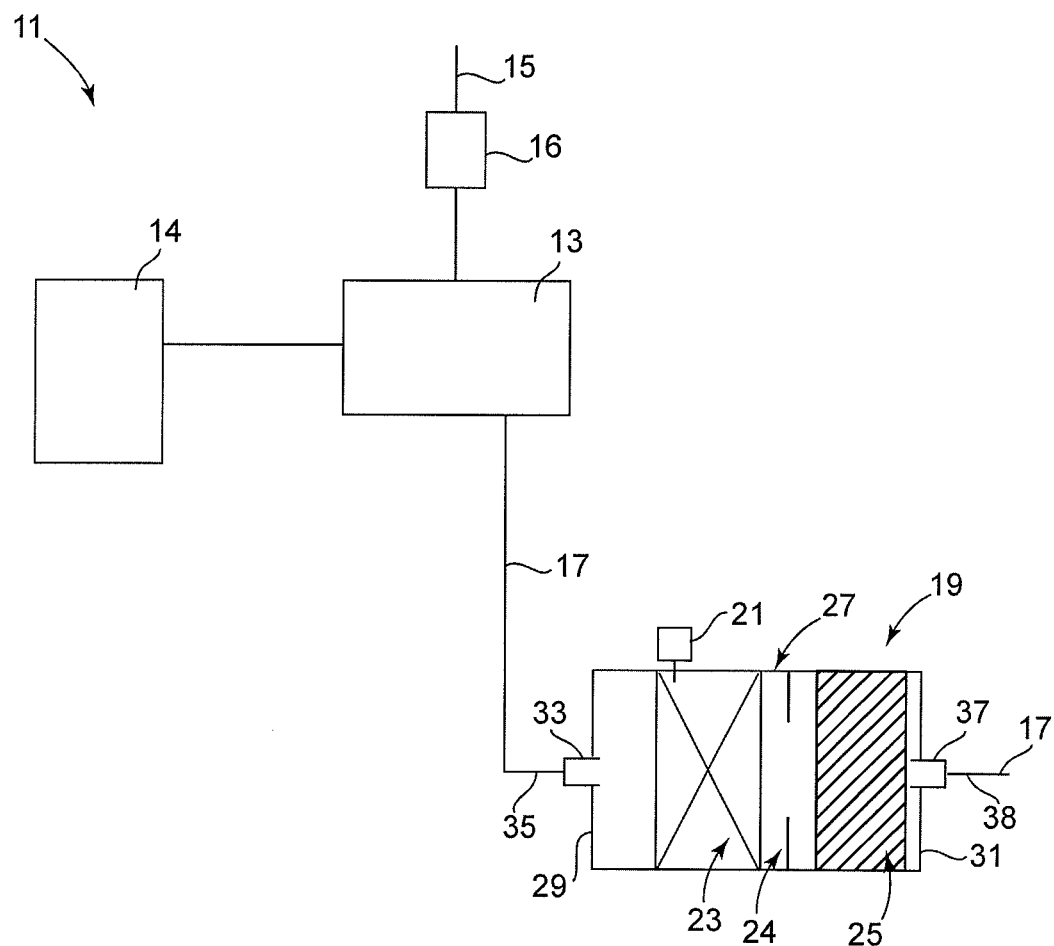
FIG. 1 is a schematic representation of an engine exhaust system having features that are examples of aspects in accordance with the principles of the present disclosure.

Referring now to FIG. 1, an engine exhaust system, generally designated 11, is shown. The engine exhaust system 11 includes an engine 13, a fuel tank 14 for supplying fuel (e.g., diesel fuel) to the engine 13, an air intake 15, an air filter 16, and an exhaust conduit 17 for conveying exhaust gas away from the engine 13. The engine exhaust system 11 also includes an exhaust treatment system, generally designated 19, which is in communication with the exhaust conduit 17. In the subject embodiment, the exhaust treatment system 19 includes a doser 21, a flow device, generally designated 23, a baffle or a diameter restriction 24, and an aftertreatment device, generally designated 25.

The aftertreatment device 25 can include a structure such as a catalytic converter, diesel particulate filter, a selective catalytic reduction (SCR) catalyst device, a lean NOx catalyst device, a lean NOx trap, or other device for removing pollutants from the exhaust stream. As these types of aftertreatment devices 25 are well known to those skilled in the art, the aftertreatment devices 25 will only be briefly described herein.

Catalytic converters (diesel oxidation catalysts or DOC's) are typically used in an exhaust system to convert undesirable gases such as carbon monoxide and hydrocarbons from a vehicle's exhaust into carbon dioxide and water. DOC's can have a variety of known configurations. Exemplary configurations include substrates defining channels that extend completely therethrough. Exemplary catalytic converter configurations having both corrugated metal and porous ceramic substrates/cores are described in U.S. Pat. No. 5,355,973, which is hereby incorporated by reference in its entirety. The substrates preferably include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

In one non-limiting embodiment, a catalytic converter can have a cell density of at least 200 cells per square inch, or in the range of 200-400 cells per square inch. A preferred catalyst for a catalytic converter is platinum with a loading level greater than 30 grams/cubic foot of substrate. In other embodiments the precious metal loading level is in the range of 30-100 grams/cubic foot of substrate. In certain embodiments, the catalytic converter can be sized such that in use, the catalytic converter has a space velocity (volumetric flow rate through the DOC/volume of DOC) less than 150,000/hour or in the range of 50,000-150,000/hour.

The diesel particulate filter (DPF), on the other hand, is typically used in an exhaust system to remove particulate matter (e.g., carbon based particulate matter such as soot) from the exhaust. DPF's can have a variety of known configurations. An exemplary configuration includes a monolith ceramic substrate having a "honey-comb" configuration of plugged passages as described in U.S. Pat. No. 4,851,015, which is hereby incorporated by reference in its entirety. Wire mesh configurations can also be used. In certain embodiments, the substrate can include a catalyst. Exemplary catalysts include precious metals such as platinum, palladium and rhodium, and other types of components such as base metals or zeolites.

For certain embodiments, diesel particulate filters can have a particulate mass reduction efficiency greater than 75%. In other embodiments, diesel particulate filters can have a particulate mass reduction efficiency greater than 85%. In still other embodiments, diesel particulate filters can have a particulate mass reduction efficiency equal to or greater than 90%. For purposes of this specification, the particulate mass reduction efficiency is determined by subtracting the particulate mass that enters the diesel particulate filter from the particulate mass that exits the diesel particulate filter, and by dividing the difference by the particulate mass that enters the diesel particulate filter.

The selective catalytic reduction (SCR) catalyst device is typically used in an exhaust system to remove undesirable gases such as nitrogen oxides (NOx) from the vehicle's emissions. SCR's are capable of converting NOx to nitrogen and oxygen in an oxygen rich environment with the assistance of reactants such as urea or ammonia, which are injected into the exhaust stream upstream of the SCR through the doser 21.

The lean NOx catalyst device is also capable of converting NOx to nitrogen and oxygen. In contrast to SCR's, lean NOx catalysts use hydrocarbons as reducing agents/reactants for conversion of NOx to nitrogen and oxygen. The hydrocarbon is injected into the exhaust stream upstream of the lean NOx catalyst. At the lean NOx catalyst, the NOx reacts with the injected hydrocarbons with the assistance of a catalyst to reduce the NOx to nitrogen and oxygen. While the exhaust treatment system 19 will be described as including an SCR, it will be understood that the scope of the present disclosure is not limited to an SCR as there are various catalyst devices that can be used in accordance with the principles of the present disclosure.

The lean NOx traps use a material such as barium oxide to absorb NOx during lean burn operating conditions. During fuel rich operations, the NOx is desorbed and converted to nitrogen and oxygen by reaction with hydrocarbons in the presence of catalysts (precious metals) within the traps.

Referring still to FIG. 1, in the subject embodiment, the exhaust treatment system 19 includes a housing assembly, generally designated 27, having a first axial end 29 and an oppositely disposed second axial end 31. In the subject embodiment, the first axial end 29 supports an inlet tube 33, which is generally aligned with an end 35 of the exhaust conduit 17. The second axial end 31 of the housing assembly 27 supports an outlet tube 37, which is generally aligned with an end 38 of the exhaust conduit 17. In the subject embodiment, the flow device 23, which will be described in greater detail subsequently, is disposed within the housing assembly 27 and positioned adjacent to the inlet tube 33. The aftertreatment device 25 is disposed within the housing assembly 27 and positioned between the flow device 23 and the outlet tube 37. The baffle 24 is disposed within the housing assembly 27 and positioned downstream of the flow device 23 such that the baffle 24 is located between the flow device 23 and the aftertreatment device 25.

Figure 2:
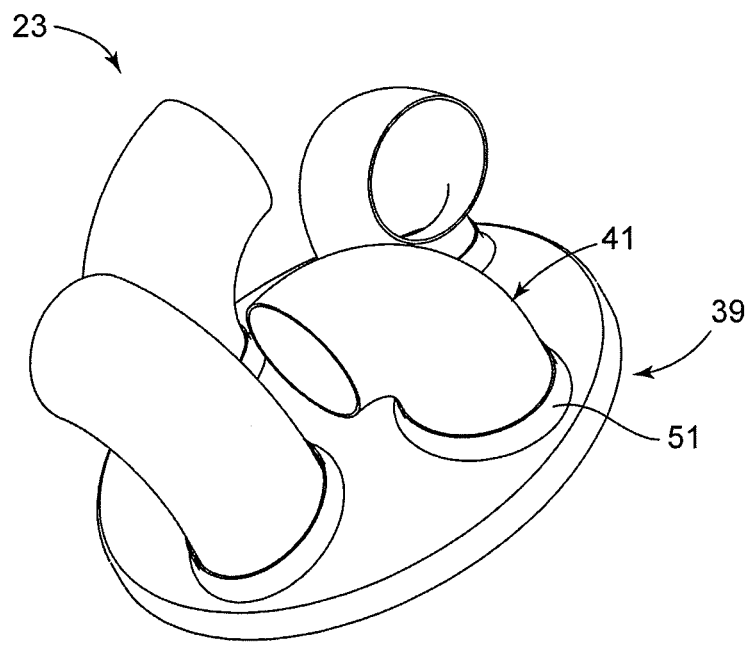
FIG. 2 is a perspective view of a flow device suitable for use in the engine exhaust system of FIG. 1.
Figure 3:
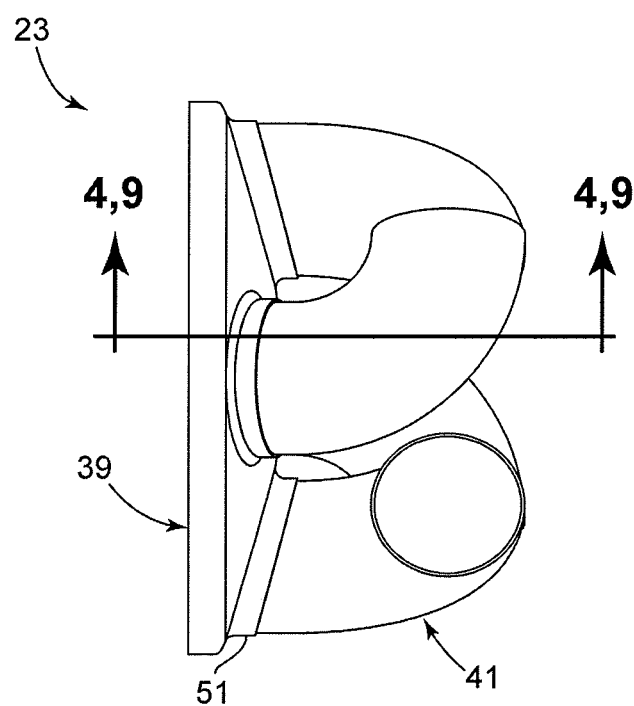
FIG. 3 is a side view of the flow device of FIG. 2.
Figure 4:
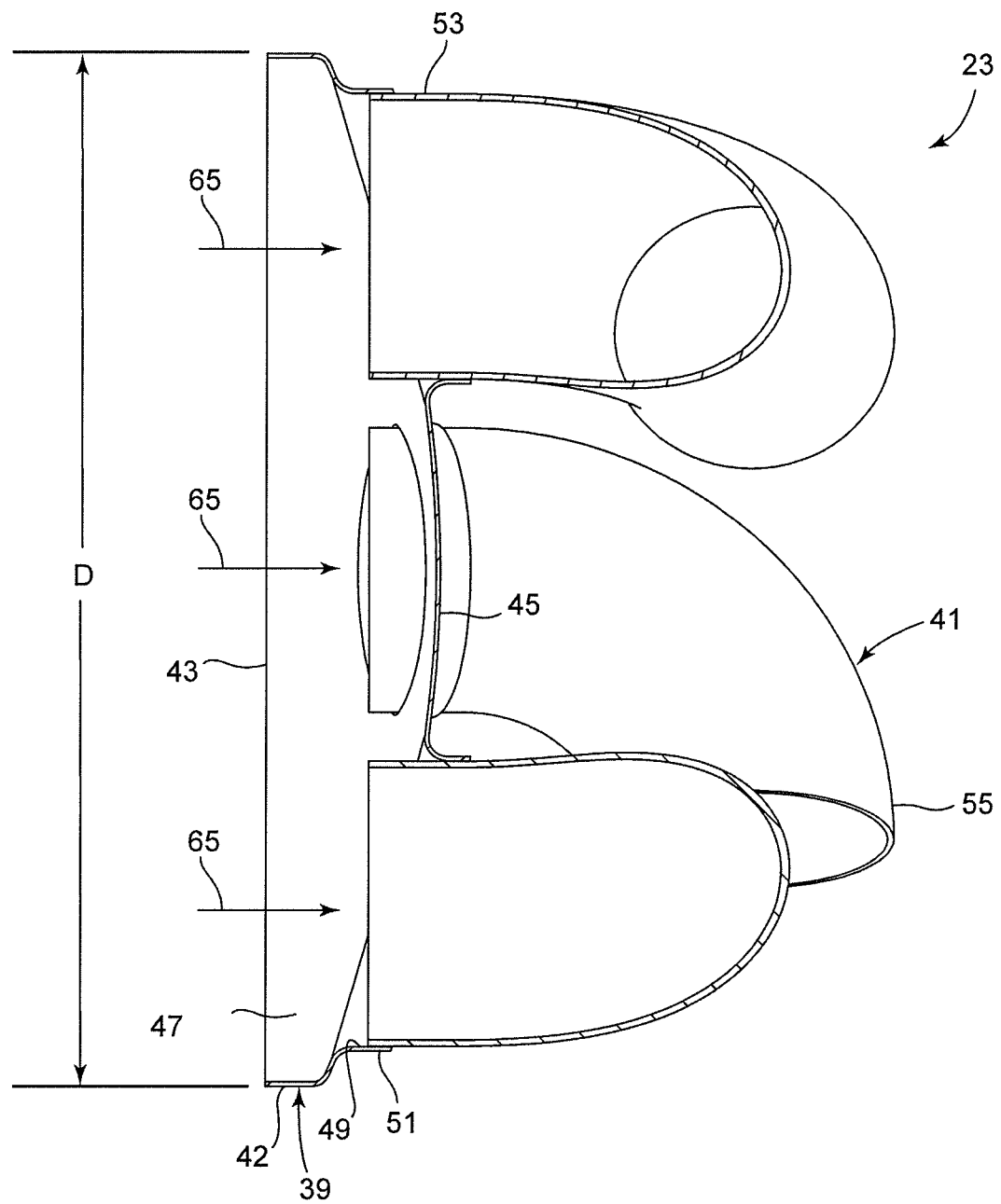
FIG. 4 is a cross-sectional view of the flow device taken on line 4-4 of FIG. 3.

Referring now to FIGS. 2-4, the flow device 23 will be described. In the subject embodiment, the flow device 23 includes a base, generally designated 39, and a plurality of flow deflector tubes, generally designated 41. In the subject embodiment, the base 39 has an outer circumferential edge 42 having a diameter D. The diameter D is sized such that when the base 39 is disposed in the housing assembly 27, the outer circumferential edge 42 of the base 39 substantially blocks the flow of exhaust between the outer circumferential edge 42 and the housing assembly 27. In the subject embodiment, the outer circumferential edge 42 of the base 39 is mounted (e.g., spot welded, etc.) to the inner diameter of the housing assembly 27.

In one embodiment, the diameter D is about 9.5 inches. In another embodiment, the diameter D is about 11 inches. In another embodiment, the diameter D is about 12.5 inches. In another embodiment, the diameter D is less than or equal to about 14 inches.

The base 39 includes an inlet end 43 and an outlet end 45. The inlet end 43 of the base 39 defines a cavity 47. In the subject embodiment, the cavity 47 is generally shallow so as to make the base 39 compact. The outlet end 45 defines a plurality of pass-through openings 49 that are in communication with the cavity 47. In the subject embodiment, the outlet end 45 includes a plurality of lips 51 each of which surrounds one of the pass-through openings 49.

Figure 5:
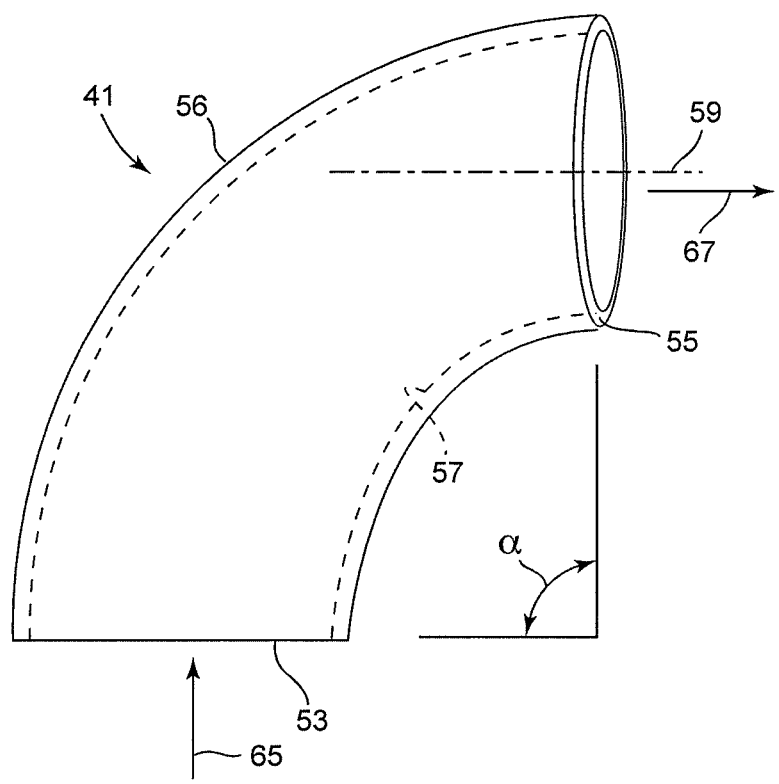
FIG. 5 is a perspective view of a flow deflector tube of the flow device of FIG. 2.

Referring now to FIG. 5, the flow deflector tubes 41 will be described. Each of the flow deflector tubes 41 includes a flow inlet 53, an oppositely disposed flow outlet 55, a transition portion 56, and a passage 57 (shown as a dashed line in FIG. 5) that extends through the flow deflector tube 41 from the flow inlet 53 to the flow outlet 55. The flow deflector tube 41 has an angled orientation such that the flow outlet 55 is oriented at an angle α from the flow inlet 53. The terms "angle" and "angled" as used to describe the configuration of the flow outlet 55 with respect to the flow inlet 53 of the flow deflector tube 41 in the disclosure and in the appended claims means any angle, which is measured as shown in FIG. 5 by reference symbol α, other than 0 or 180 degrees unless otherwise limited. In a preferred embodiment, the angle α is about 90 degrees. However, it will be understood that the scope of the present disclosure is not limited to the flow outlet 55 being oriented about 90 degrees from the flow inlet 53 as the flow outlet 55 could be oriented more than 90 degrees from the flow inlet 53 or less than 90 degrees from the flow inlet 53. Although in a preferred embodiment, the angle α is greater than or equal to 90 degrees or more. In the subject embodiment, the transition portion 56 provides for a gradual change in orientation between the flow inlet 53 and the flow outlet 55. For example, the transition portion 56 in the subject embodiment is curved.

Figure 6:
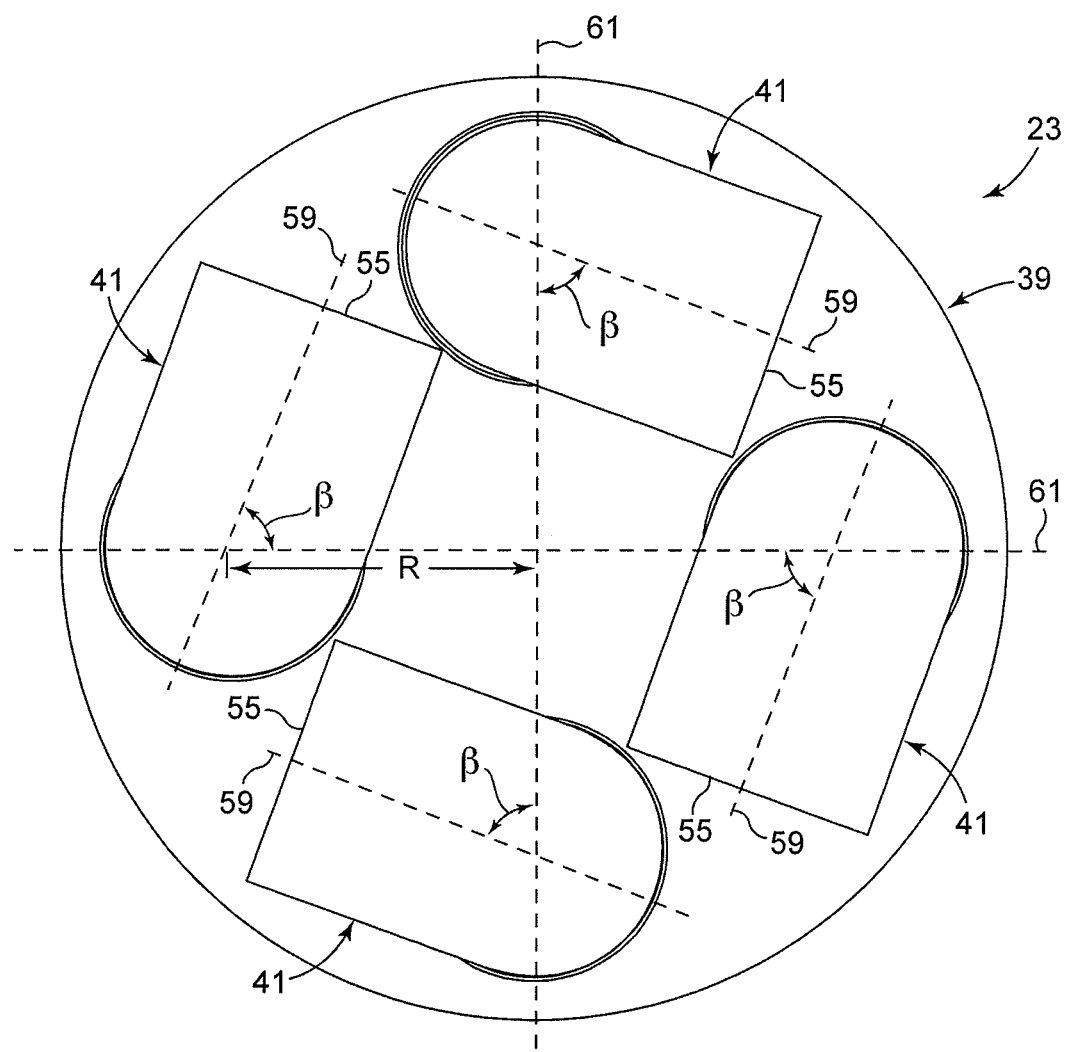
FIG. 6 is a front view of the flow device of FIG. 3.
Figure 7:
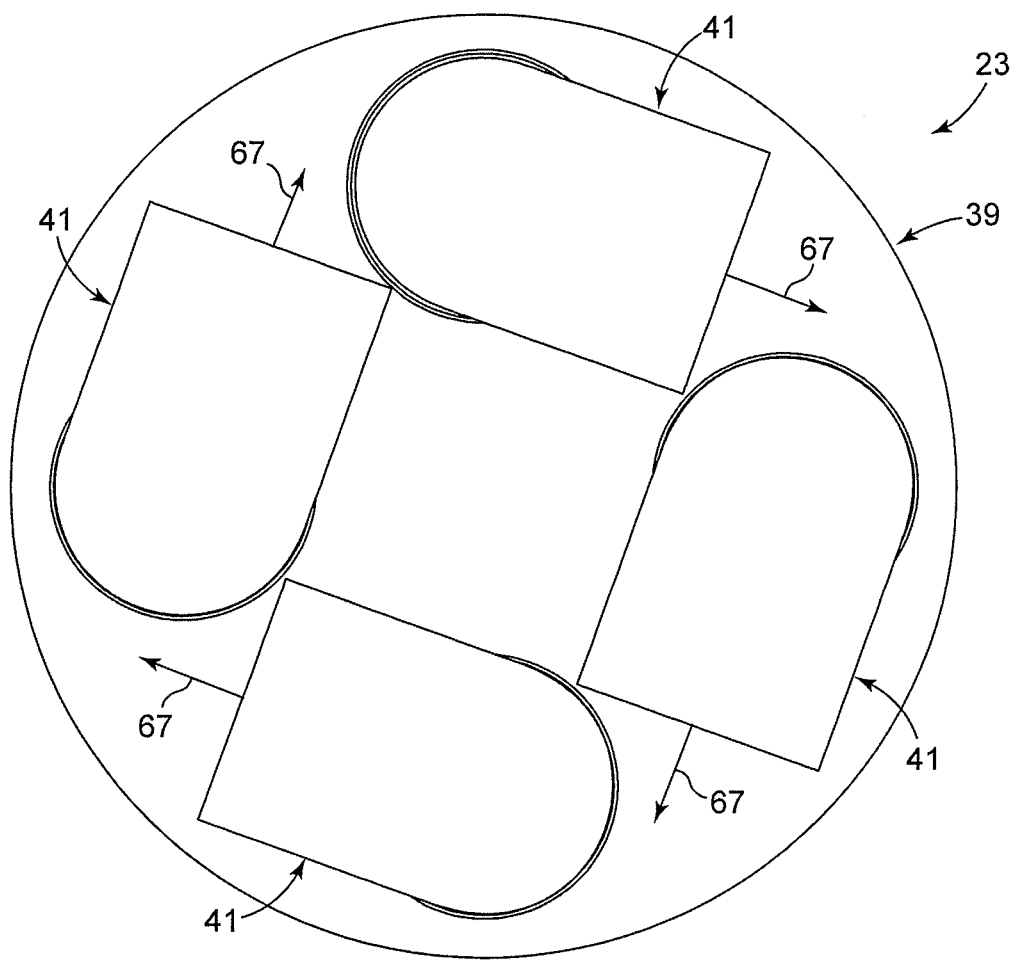
FIG. 7 is a front view of the flow device of FIG. 3.

Referring now to FIGS. 6 and 7, the installation and orientation of the flow deflector tubes 41 with respect to the base 39 will be described. In the subject embodiment, and by way of example only, there are four flow deflector tubes 41. The flow inlet 53 of each of the flow deflector tubes 41 is inserted through one of the lips 51 and into the corresponding pass-through opening 49 of the outlet end 45 of the base 39. The lip 51, which surrounds the pass-through opening 49, supports the flow inlet 53 of the flow deflector tube 41. With the flow deflector tubes 41 inserted into the pass-through openings 49 of the base 39, the flow deflector tubes 41 are oriented with respect to the base 39 such that a first plane 59 (shown as a dashed line in FIG. 6), which symmetrically bisects the flow deflector tube 41 through the center of the flow inlet 53 and the center of the flow outlet 55, is at an angle β from a second plane 61 (shown as a dashed line in FIG. 6), which symmetrically bisects the flow device 23 through the center of the base 39 and the center of the flow inlet 53 of the flow deflector tube 41. It is preferred that the angle β be less than or equal to 90 degrees. It is more preferred that the angle β be about 70 degrees. In a preferred embodiment, the flow deflector tubes 41 are positioned such that the center of the flow inlet 53 of each flow deflector tube 41 is a radial distance R from the center of the base 39. It will be understood, however, that the scope of the present disclosure is not limited to the center of the flow inlet 53 of each flow deflector tube 41 being positioned a distance R from the center of the base 39, as it may be advantageous in certain applications for the flow deflector tubes 41 to have distinct distances R between the center of the base 39 and each of the flow deflector tubes 41.

In the subject embodiment, the base 39 and each of the flow deflector tubes 41 are made from a material such as steel. After the flow deflector tubes 41 are inserted into the pass-through openings 49 of the base 39, each flow deflector tube 41 is affixed to the base 39. In the subject embodiment, each flow deflector tube 41 is welded to the corresponding lip 51 of the base 39. As other methods of affixation are possible, such as a press-fit, the scope of the present disclosure is not limited to the flow deflector tube 41 being welded to the base 39.

Referring now to FIGS. 4, 5, 7, the flow of exhaust through the flow device 23 will be described. Exhaust enters the cavity 47 of the base 39 through the inlet end 43 in an axial flow direction 65 (shown as an arrow in FIGS. 4 and 5). Exhaust, flowing in the axial flow direction 65, enters the passages 57 of the flow deflector tubes 41 through the flow inlets 53 of the flow deflector tubes 41, which are disposed in the pass-through openings 49 in the base 39. As the exhaust travels through the passages 57, the transition portion 56 of the flow deflector tubes 41 changes the direction of the exhaust from the axial flow direction 65 to a radial flow direction 67 (shown as an arrow in FIGS. 5 and 7). The angle of the radial flow direction 67 with respect to the axial flow direction 65 is dependent on the angle α (shown in FIG. 6). In the subject embodiment, and by way of example only, the angle α is about 90 degrees. As shown in FIG. 5, the axial flow direction 65 is rotated about 90 degrees in the clockwise direction through the transition portion 56 of the flow deflector tube 41 into the radial flow direction 67. While exhaust enters the cavity 47 of the flow device 23 in the axial flow direction 65, exhaust leaves the flow outlet 55 of the flow deflector tube 41 of the flow device 23 of the subject embodiment in the radial flow direction 67. The purpose for the change in flow direction will be described in more detail subsequently.

Figure 8:
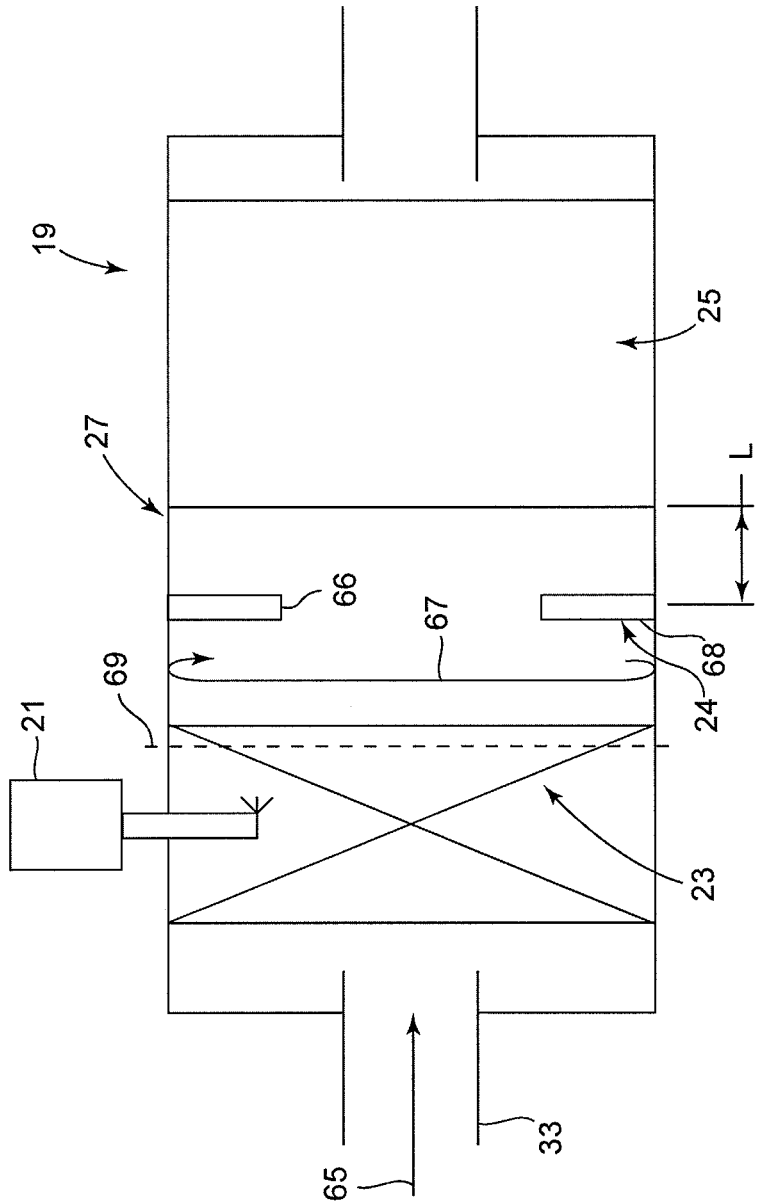
FIG. 8 is a schematic representation of the exhaust treatment system of FIG. 1.

Referring now to FIGS. 4 and 8, the flow of exhaust through the exhaust treatment system 19 will be described. In the subject embodiment, the housing assembly 27 includes both the flow device 23 and the aftertreatment device 25. In a preferred embodiment, the housing assembly 27 is a larger body having a diameter that is greater than or equal to eight inches. In one embodiment, the housing assembly 27 is a muffler body having a diameter in the range of eight to thirteen inches. However, it will be understood that the scope of the present disclosure is not limited to the housing assembly 27 having a diameter greater than or equal to eight inches as the housing assembly 27 could be a small body such as an exhaust pipe.

Exhaust enters an inlet tube 33 of the housing assembly 27. The exhaust, traveling in the axial flow direction 65, enters the cavity 47 of the flow device 23 and then flows through the flow deflector tubes 41. As previously described, the flow direction of the exhaust changes as the exhaust travels through the transition portion 56 of the flow deflector tubes 41. Therefore, the exhaust exits the flow device 23 in the radial flow direction 67. As the exhaust exits the flow deflector tubes 41 in the radial flow direction 67, the exhaust swirls circumferentially around the housing assembly 27. As the exhaust swirls circumferentially around the housing assembly 27, the doser 21, in the subject embodiment, injects reactants (e.g., urea, ammonia, hydrocarbons) into the exhaust.

Due to the circumferential swirling of the exhaust, the reactants are uniformly distributed in the exhaust. As previously stated, it is preferred that the housing assembly 27 be a large body having a diameter greater than or equal to eight inches. This large body of the housing assembly 27 in a preferred embodiment promotes the effective circumferential swirling of the exhaust and promotes the uniform distribution of the reactants in the exhaust. Uniform distribution of the reactants is important for the aftertreatment device 25 to perform effectively. In the prior art exhaust treatment systems, uniform distribution of the doser contents into the exhaust was achieved through a long axial distance between the doser 21 and the aftertreatment device 25. However, by changing the flow direction of the exhaust, the exhaust and the contents of the doser 21 that are injected into the exhaust are effectively mixed over a much smaller axial distance. Therefore, one advantage of the present disclosure is that it provides a uniform mixture of the exhaust and the contents of the doser 21 over a small axial distance. Additionally, the swirling action allows reactants to vaporize and/or hydrolyze in a relatively short axial distance. For example, a reactant such as urea can be vaporized and decomposed into ammonia and carbon dioxide while swirling in a circumferential direction thereby shortening the axial distance required for the vaporization and decomposition of the urea to occur.

In one embodiment, after the exhaust mixture exits the flow device 23, the exhaust mixture enters the aftertreatment device 25. As previously described, the aftertreatment device 25 converts the exhaust mixture, which contains NOx and reactants, to nitrogen and oxygen or carbon dioxide and water in the case where the device is designed to reduce total NOx emissions.

Referring now to FIG. 8, after the exhaust mixture exits the flow device 23, the exhaust mixture flows through a passage 66 in the baffle 24. The baffle 24 includes a body 68 that defines the passage 66. In the subject embodiment, the passage 66 is centrally disposed in the body 68. An outer diameter of the body 68 is sized to fit within the housing 27. The passage 66 in the baffle 24 is sized such that the inner diameter of the passage 66 is less than the diameter of the housing 27.

As the exhaust mixture circumferentially swirls in the housing assembly 27, heavier reactants (e.g., unvaporized or unhydrolyzed reactants) in the exhaust mixture are pushed radially outward from the exhaust mixture by centrifugal force such that the heavier reactants are retained against a wall of the housing assembly 27. As the exhaust mixture circumferentially flows past the reactants disposed against the wall of the housing assembly 27, these reactants are vaporized or hydrolyzed. After the vaporization or hydrolyzation of these reactants, the reactants reenter the exhaust mixture and pass through the passage 66 of the baffle 24. After the exhaust mixture passes through the passage 66, the exhaust mixture enters the aftertreatment device 25.

The housing assembly 27 defines a first section disposed upstream of the baffle 24 and a second section disposed downstream of the baffle 24. The flow device 23 is disposed in the first section of the housing assembly 27 while the aftertreatment device 25 is disposed in the second section. Since the inner diameter of the passage 66 in the baffle 24 is less than diameter of the housing 27, the unvaporized or unhydrolyzed reactants, which are held against the wall of the housing assembly 27 by the centrifugal force of the exhaust mixture, are retained in the first section of the housing assembly 27 rather than flowing to the aftertreatment device 25. The body 68 of the baffle 24 reduces the amount of unvaporized or unhydrolyzed reactants at the aftertreatment device 25. After the reactants vaporize and reenter the exhaust mixture, however, the reactants can flow through the passage 66 to the aftertreatment device 25.

The passage 66 is sized to retain the unvaporized or unhydrolyzed reactants in the first section of the housing assembly 27. In one embodiment, the passage 66 is also sized to provide a generally uniform distribution of the exhaust mixture on the face of the aftertreatment device 25. In one embodiment, and by way of example only, the inner diameter of the passage 66 per the diameter of the housing assembly 27 is in a range of about 0.20 to about 0.95. In another embodiment, and by way of example only, the inner diameter of the passage 66 per the diameter of the housing assembly 27 is in a range of about 0.55 to about 0.85. In another embodiment, the inner diameter of the passage 66 per the diameter of the housing assembly 27 is less than or equal to about 0.95.

In the subject embodiment, the baffle 24 is disposed a longitudinal distance L from the aftertreatment device 25.

The longitudinal distance L is a function of the velocity of the exhaust mixture as the exhaust mixture passes through the passage 66. The longitudinal distance L is selected such that the exhaust mixture is generally uniformly distributed on the face of the aftertreatment device 25. In one embodiment, and by way of example only, the longitudinal distance L is in a range of about 0.25 inches to about 6 inches. In another embodiment, and by way of example only, the longitudinal distance L is in a range of about 0.5 inches to about 4 inches. another embodiment, and by way the longitudinal distance L is in a range of about 1.5 inches to about 2.5 inches. In another embodiment, and by way of example only, the longitudinal distance L is less than or equal to about 4 inches.

By retaining the unvaporized or unhydrolyzed reactants in the first section of the housing assembly 27, the baffle 24 eliminates or reduces the amount of unvaporized or unhydrolyzed reactants in the exhaust mixture at the aftertreatment device 25. Since the efficiency of the exhaust treatment system 19 increases as the amount of unvaporized or unhydrolyzed reactants in the exhaust gas mixture decreases, the combination of the flow device 23 and the baffle 24 allows for a more efficient exhaust treatment system 19 in a more compact space.

Figure 9:
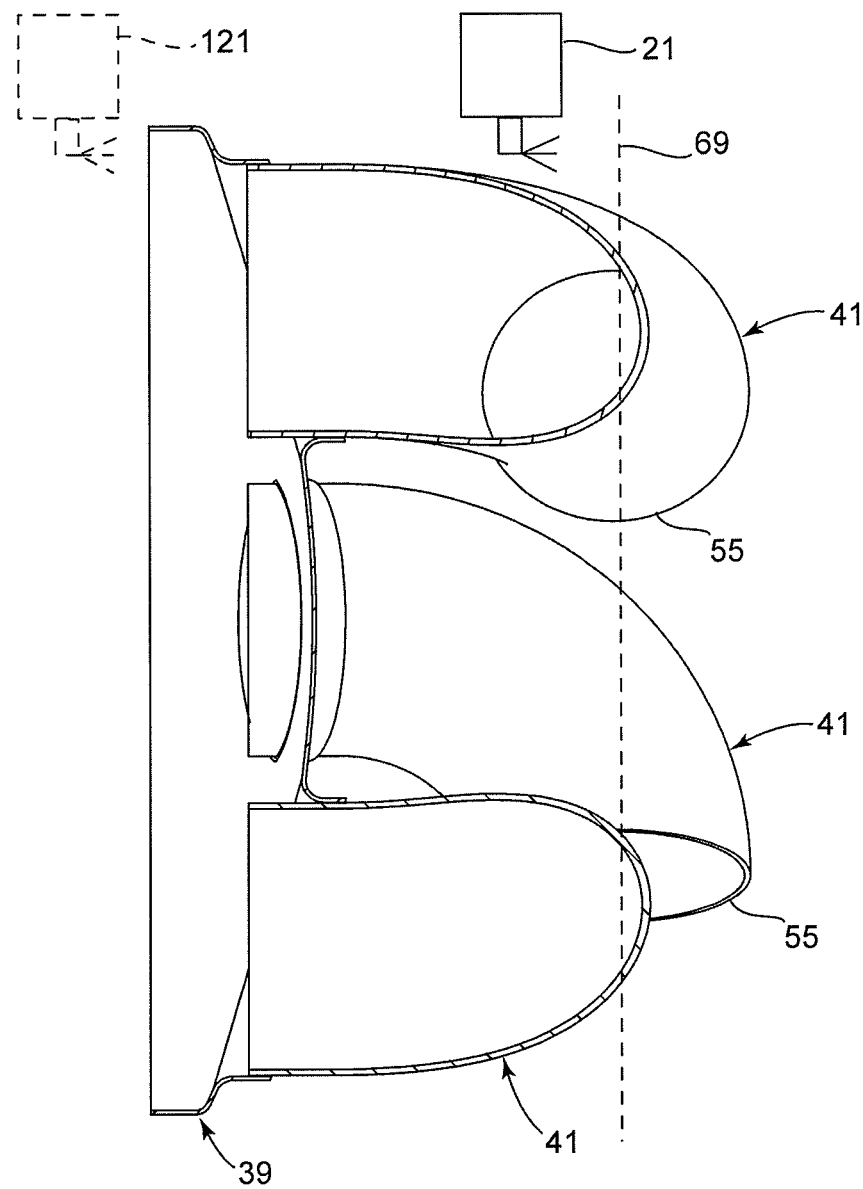
FIG. 9 is a cross-sectional view of the flow device taken on line 9-9 of FIG. 3.

Referring now to FIGS. 8 and 9, in a preferred embodiment, the doser 21 is positioned upstream from a perspective of axial flow 65 (i.e., to the left with respect to FIGS. 8 and 9) of a mixing plane 69, which is defined by the centers of the flow outlets 55 of the flow deflector tubes 41. While it will be understood that the scope of the present disclosure is not limited to the doser 21 being to the left of the mixing plane 69, such a configuration is preferred. The primary reason for this preference is that by injecting the reactants into the exhaust at a location to the left of the mixing plane 69, the reactants from the doser 21 are subjected to the circumferential swirling of the exhaust for a greater axial distance thereby resulting in a more uniform exhaust mixture. Although the doser 21 is shown in FIGS. 8 and 9 as being disposed between the mixing plane 69 and the base 39 of the flow device 23, in the alternative, a doser 121 (shown in FIG. 9 with dashed lines) could be positioned upstream with respect to axial flow 65 (i.e., to the left with respect to FIGS. 8 and 9) of the inlet end 43 of the base 39. In this doser 121 position, the reactants would be injected into the exhaust prior to the exhaust entering the cavity 47 of the flow device 23.

Referring now to FIG. 10, a schematic representation of an alternative embodiment of an exhaust treatment system 219 is shown. In describing this alternative embodiment, elements which are the same as, or functionally equivalent to elements in the embodiments shown in FIGS. 1-9 will bear the same reference numeral, plus 200, while new elements will have reference numerals greater than 269. In the subject embodiment, a catalytic converter 277, a diesel particulate filter 279, a doser 221, a flow device 223, and a first and second SCR 225 are disposed inside of a housing assembly 227. Exhaust enters an inlet tube 233, which is disposed on a first axial end 229 of the housing assembly 227 of the exhaust treatment system 219. The exhaust flows in an axial flow direction 265 through the catalytic converter 277. The exhaust then flows through the diesel particulate filter 279. After exiting the diesel particulate filter 279, the exhaust enters the flow device 223, where the axial flow direction 265 of the exhaust is converted to a radial flow direction 267. As the exhaust swirls circumferentially through the housing after leaving the flow device 223, the doser 221, which is disposed to the before of a mixing plane 269, injects reactants (e.g., urea or ammonia where an SCR catalyst is used or hydrocarbons where a lean NOx catalyst or a lean NOx trap is used) into the exhaust forming an exhaust mixture. The exhaust mixture then flows through a passage 268 of a baffle 224 and into the first SCR 225 where the exhaust mixture is converted into nitrogen and oxygen. The exhaust mixture then flows through the second SCR 225 where any remaining NOx and urea or ammonia is converted to nitrogen and oxygen.

Referring now to FIG. 11, a schematic representation of an alternative embodiment of an exhaust treatment system 319 is shown. In describing this alternative embodiment, elements which are the same as, or functionally equivalent to elements in embodiments shown in FIGS. 1-9 will bear the same reference numeral, plus 300, while new elements will have reference numerals greater than 369. In the subject embodiment, a housing assembly, generally designated 327, includes an inlet portion 371, an outlet portion 373, and a connecting tube 375. A catalytic converter 377, a diesel particulate filter 379, a doser 321, and a flow device 323 are disposed in the inlet portion 371 of the housing assembly 327 while a first and second SCR 325 are disposed in the outlet portion 373. In the subject embodiment, the doser 321 is disposed to the left of a mixing plane 369 of the flow device 323 and injects reactants into the exhaust. The connecting tube 375 provides communication between the inlet and outlet portions 371, 373. As the connecting tube 375 includes an inner diameter that is less than an inner diameter of the inlet portion 371 of the housing assembly 327, the interface between the inlet portion 371 and the connecting tube 375 functions as a baffle.

Referring now to FIG. 12, a schematic representation of an alternative embodiment of an exhaust treatment system 419 is shown. In describing this alternative embodiment, elements which are the same as, or functional equivalents to elements in embodiments shown in FIGS. 1-9 will bear the same reference numeral, plus 400, while new elements will have reference numerals greater than 469. In the subject embodiment, a housing assembly, generally designated 427, includes an inlet portion 471, an outlet portion 473, and a connecting tube 475. A catalytic converter 477, a diesel particulate filter 479 are disposed in the inlet portion 471 of the housing assembly 427 while a first and second SCR 425, a flow device 423 and a baffle 424 are disposed in the outlet portion 473. The connecting tube 475 provides communication between the inlet and outlet portions 471, 473 and in the subject embodiment also provides a location for a doser 421. Therefore, in this embodiment, the doser 421 injects reactants into the exhaust prior to the exhaust entering the flow device 423.

Referring now to FIG. 13, a schematic representation of an alternative embodiment of an exhaust treatment system 519 is shown. In describing this alternative embodiment, elements which are the same as, or functional equivalents to elements in embodiments shown in FIGS. 1-9 will bear the same reference numeral, plus 500, while new elements will have reference numerals greater than 569. In the subject embodiment, a housing assembly, generally designated 527 includes an inlet portion 571, an outlet portion 573, and a connecting tube 575. A catalytic converter 577, a diesel particulate filter 579 are disposed in the inlet portion 571 of the housing assembly 527 while a doser 521, a flow device 523, a baffle 524 and a first and second SCR 525 are disposed in the outlet portion 573. The connecting tube 575 provides communication between the inlet and outlet portions 571, 573.

Figure 14:
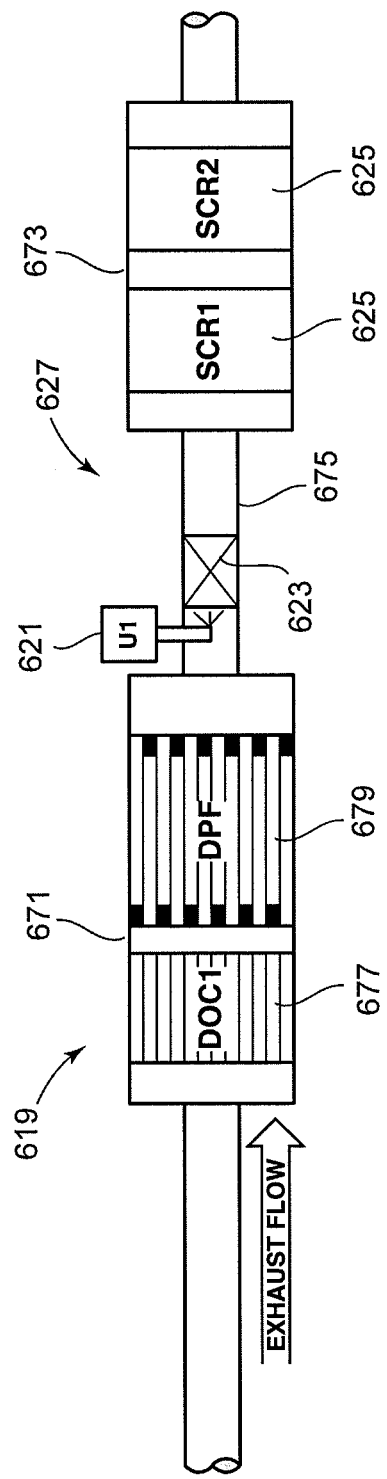
FIG. 14 is a schematic representation of an alternate embodiment of the exhaust treatment system of FIG. 1.

Referring now to FIG. 14, a schematic representation of an alternative embodiment of an exhaust treatment system 619 is shown. In describing this alternative embodiment, elements which are the same as, or functional equivalents to elements in embodiments shown in FIGS. 1-9 will bear the same reference numeral, plus 600, while new elements will have reference numerals greater than 669. In the subject embodiment, a housing assembly, generally designated 627, includes an inlet portion 671, an outlet portion 673, and a connecting tube 675. A catalytic converter 677 and a diesel particulate filter 679 are disposed in the inlet portion 671 of the housing assembly 627 while a first and second SCR 625 are disposed in the outlet portion 673. A doser 621 and a flow device 623 are disposed in the connecting tube 675, which provides communication between the inlet and outlet portions 671, 673.

Figure 15:
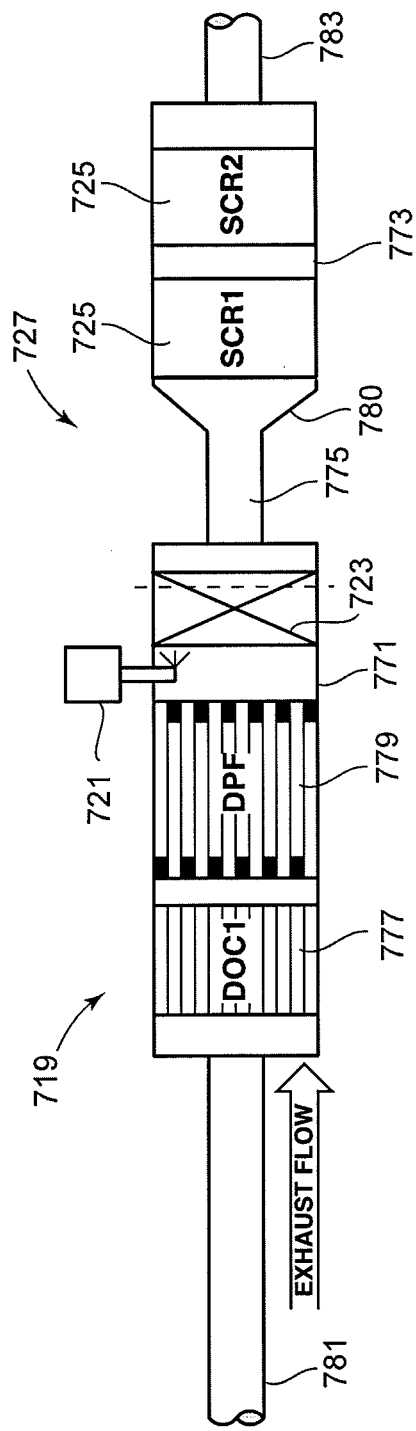
FIG. 15 is a schematic representation of an alternate embodiment of the exhaust treatment system of FIG. 1.

Referring now to FIG. 15, a schematic representation of an alternative embodiment of an exhaust treatment system 719 is shown. In describing this alternative embodiment, elements which are the same as, or functionally equivalent to elements in embodiments shown in FIGS. 1-9 will bear the same reference numeral, plus 700, while new elements will have reference numerals greater than 769. In the subject embodiment, a housing assembly, generally designated 727, includes an inlet portion 771, an outlet portion 773, and a connecting tube 775. A catalytic converter 777, a diesel particulate filter 779, a doser 721, and a flow device 723 are disposed in the inlet portion 771 of the housing assembly 727 while a first and second SCR 725 are disposed in the outlet portion 773. In the subject embodiment, the doser 721 is disposed to the left of the flow device 723 and injects reactants into the exhaust. The connecting tube 775 provides communication between the inlet and outlet portions 771, 773 and defined a constriction (e.g., a reduction in diameter as compared to the inlet and outlet portions 771, 773). A tapered portion 780 is provided within the outlet portion 773 at a location upstream from the first SCR 725. The tapered portion 780 defines an inner passage that gradually enlarges as the tapered portion 780 extends from the connecting tube 775 toward the first SCR 725. In one embodiment, the tapered portion 780 is generally conical. The combination of the flow device 723, the reduced diameter connecting tube 775 and the tapered portion 780 provides an arrangement with minimal voids for collecting reactant that provides generally even flow distribution at the upstream face of the SCR 725 and uniform heating of the SCR 725.

In one embodiment of the housing assembly 727, the inlet portion 771 includes an inlet pipe 781 having a diameter of about 4 inches, the outlet portion 773 includes an outlet pipe 783 having a diameter of about 4 inches, the connecting tube 775 has a diameter of about 6 inches, and the catalytic converter 777, the diesel particulate filter 779, the flow device 723 and the SCR's 725 each have outer diameters of about 10.5 inches. In other embodiment of the housing assembly, the inlet pipe 781 has a diameter of about 5 inches, the outlet pipe 783 has a diameter of about 5 inches, the connecting tube 775 has a diameter of about 6 inches, and the catalytic converter 777, the diesel particulate filter 779, the flow device 723 and the SCR's 725 each have outer diameters of about 12 inches. Of course, other sizes could be used as well.

Figure 16:
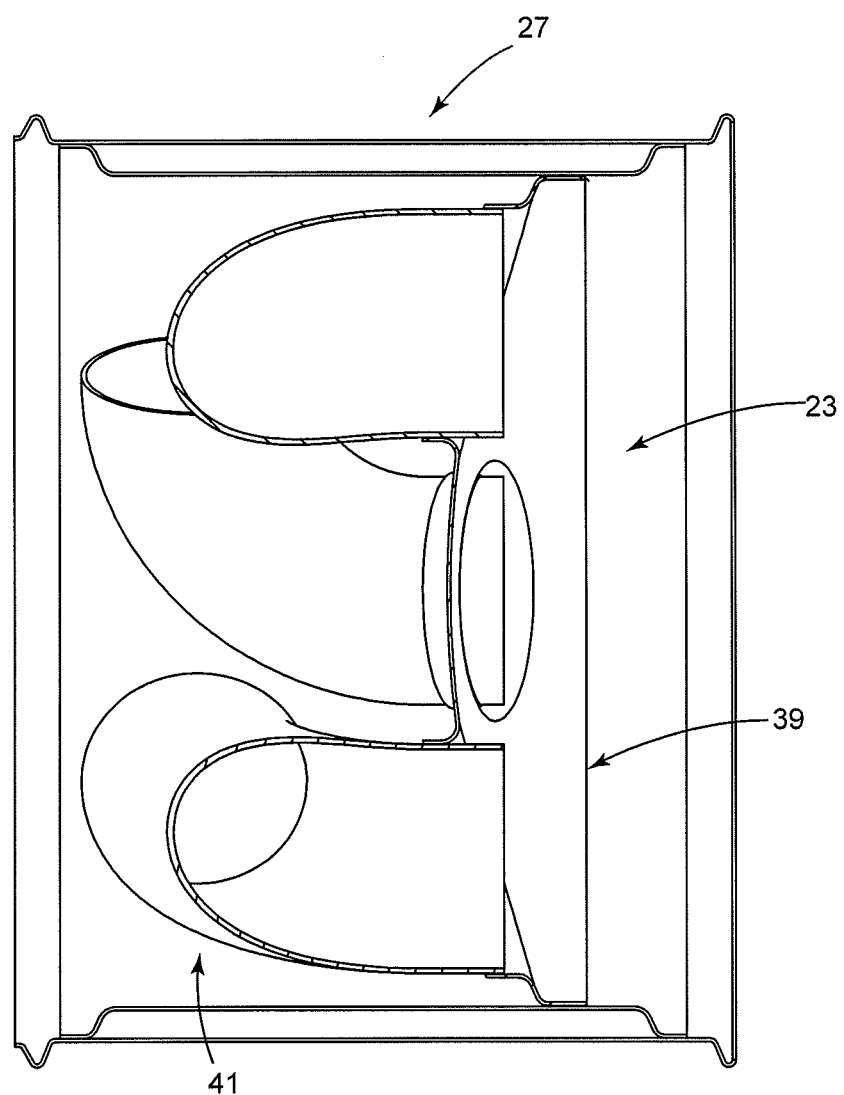
FIG. 16 is a view of the flow device of FIG. 2 in a housing assembly.
Figure 17:
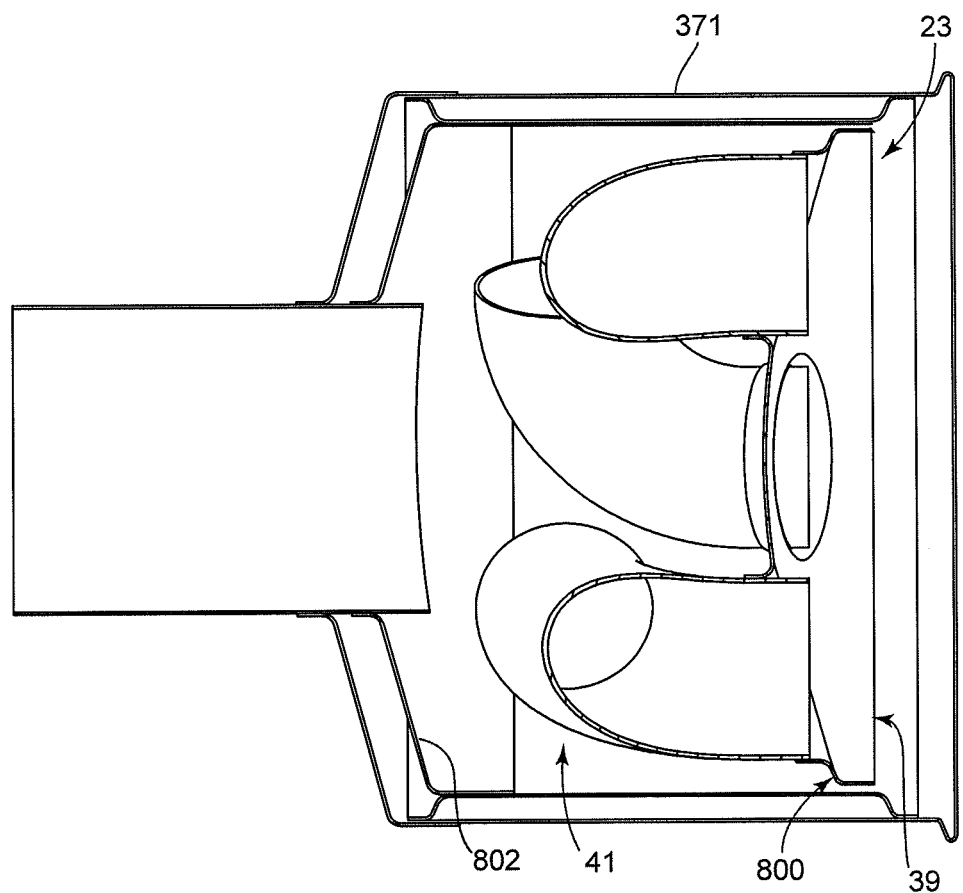
FIG. 17 is a view of the flow device of FIG. 2 in an alternate embodiment of a housing assembly.
Figure 18:
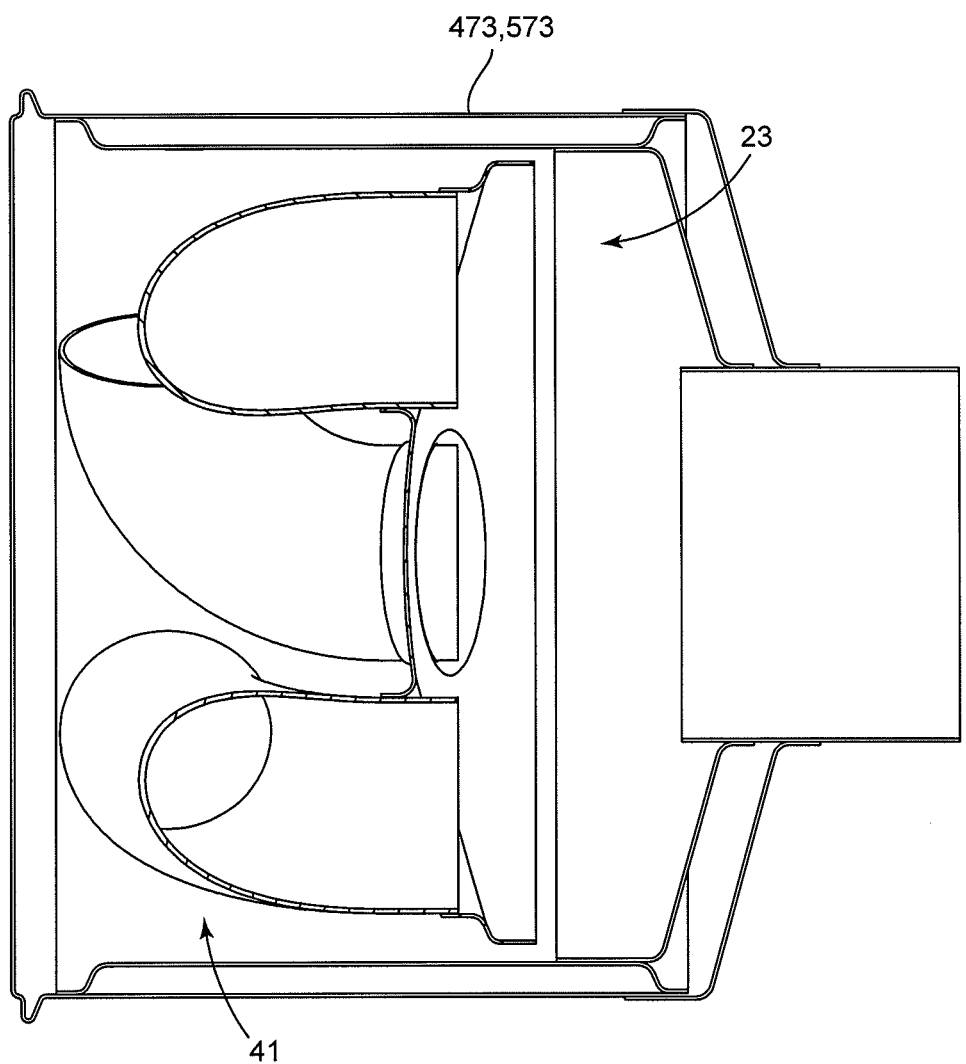
FIG. 18 is a view of the flow device of FIG. 2 in an alternate embodiment of a housing assembly.

Referring now to FIG. 16-18, the flow device 23 is shown in various housing assembly 27 embodiments. In FIG. 16, the flow device 23 is mounted at a mid-portion of the housing assembly 27 for use in the exhaust treatment system 219, which is shown schematically in FIG. 10. In FIG. 17, the flow device 23 is mounted at an outlet portion 371 of the housing assembly 327 for use in the exhaust treatment system 319, which is shown schematically in FIG. 11. In FIG. 18, the flow device 23 is mounted at an inlet portion 471, 571 of the housing assembly 427, 527 for use in the exhaust treatment systems 419, 519, which are shown schematically in FIGS. 12 and 13, respectively.

As previously stated, one of the many advantages of the exhaust treatment system 19 of the present disclosure is that a uniform exhaust mixture, which includes engine exhaust and reactants from the doser 21, is achieved. By changing the flow direction of the exhaust through the flow device 23, the reactants can be uniformly distributed throughout the exhaust.

Another advantage of the exhaust treatment system 19 of the present disclosure is that the overall length of the exhaust treatment system 19 can be reduced as less axial distance is needed between the doser 21 and the aftertreatment device 25 to uniformly mix exhaust and the reactants from the doser 21.

While the exhaust treatment system 19 of the present disclosure has been described with respect to NOx reduction devices, the teachings of the present disclosure can be used for any application in which mixing or separating of a material dispensed into exhaust is desired. For example, hydrocarbons can be injected upstream of a catalytic converter wherein combustion of the hydrocarbons at the catalytic converter generates heat for regenerating a downstream diesel particulate filter. Mixing is desirable in this application to provide efficient use of the catalyst and substrate.

As described above, flow devices in accordance with the principles of the present disclosure provide excellent flow distributions by the way of thermal mixing and reactant solution vaporization. However, at low exhaust temperatures, incomplete vaporization and/or decomposition of reactant may result in the deposition of reactant at high-contact areas of a flow device (e.g., see areas 800 and 802 of the flow device 23 of FIG. 17). For example, the use of urea as a reactant at low exhaust temperatures may result in the deposition of solid urea, cyanuric acid and biuret on high-contact areas of the flow device thus reducing overall NOx efficiency of the SCR aftertreatment system.

An additional side effect of the low temperature operation relates to a time lag that may occur between the time the reactant is injected and the time the reactant reaches the SCR aftertreatment system. At lower temperatures, reactant takes longer to vaporize in the exhaust stream. Un-vaporized reactant (e.g., urea) has a longer residence time in the flow device than vaporized reactant because it swirls longer within the flow device due to centrifugal force that retains the un-vaporized reactant in the flow device. Therefore, at low temperatures (e.g., less than 400 degrees Celsius) the reactant (e.g., urea) swirls longer than at higher temperatures (greater than 400 degrees Celsius) because of the additional time required for vaporization thus resulting in increased time between injection and NOx reduction.

When using urea as a reactant, it is desirable to maximize the percentage of urea that decomposes to ammonia and carbon dioxide prior to reaching the SCR aftertreatment device. Urea starts to decompose at about 160 C. However, this is simply a sublimation phase change where urea vapor is formed. The actual decomposition starts to occur at elevated exhaust gas temperatures. In fact, only about 50% of the urea decomposes to ammonia at 400 C. The remaining urea decomposes on the SCR catalyst surface thus reducing the efficiency of the catalyst storage function which should primarily adsorb ammonia.

When urea is injected into the exhaust stream, the following chemical reactions take place causing the urea to decompose into ammonia and carbon dioxide:

$$CO(NH_2)_2 \xrightarrow{Heat} NH_3 + HNCO \qquad \text{Equation 1}$$

$$HNCO + H_2O \longrightarrow NH_3 + CO_2 \qquad \text{Equation 2}$$

The intermediate compound found in Equations 1 & 2, isocyanic acid (HNCO), is stable in the gas phase. The stability of HNCO can prevent or resist the full decomposition of the urea. To enhance the decomposition of urea, it is desirable to provide a hydrolysis catalyst at the flow device to catalyze the decomposition of HNCO to ammonia and carbon dioxide. A flow device with excellent flow distribution properties that also serves as a hydrolysis catalyst can enhance overall SCR performance. In one embodiment, the urea hydrolysis catalyst can include a base metal oxide formulation. For example, a wash coat including mixture of $TiO_2$ at 110 g/l, $Al_2O_3$ at 30 g/l, and $SiO_2$ at 10 g/l can be used.

It will be appreciated that a variety of techniques can be used to incorporate catalysts such as hydrolysis catalysts into flow devices in accordance with the principles of the present disclosure. For example, hydrolysis catalysts can be applied as a wash coat to the entire surface of the flow device, or can be applied as a wash coat to selected regions of the flow device (e.g., high urea deposit areas). In certain embodiments, the surface of the flow device may be roughened prior to applying the wash coat. For embodiments where wash coat is applied to only selected regions of the flow device, the selected regions may be roughened while the remainder of the flow device may remain smooth. In addition to catalyzing the decomposition of reactant, the wash coat can also cause turbulence that enhances flow distribution and mixing. In certain embodiments, the flow device can be made of a metallic material, a metallic catalyst material, a ceramic and/or silicon carbine material, or other materials.

Figure 19:
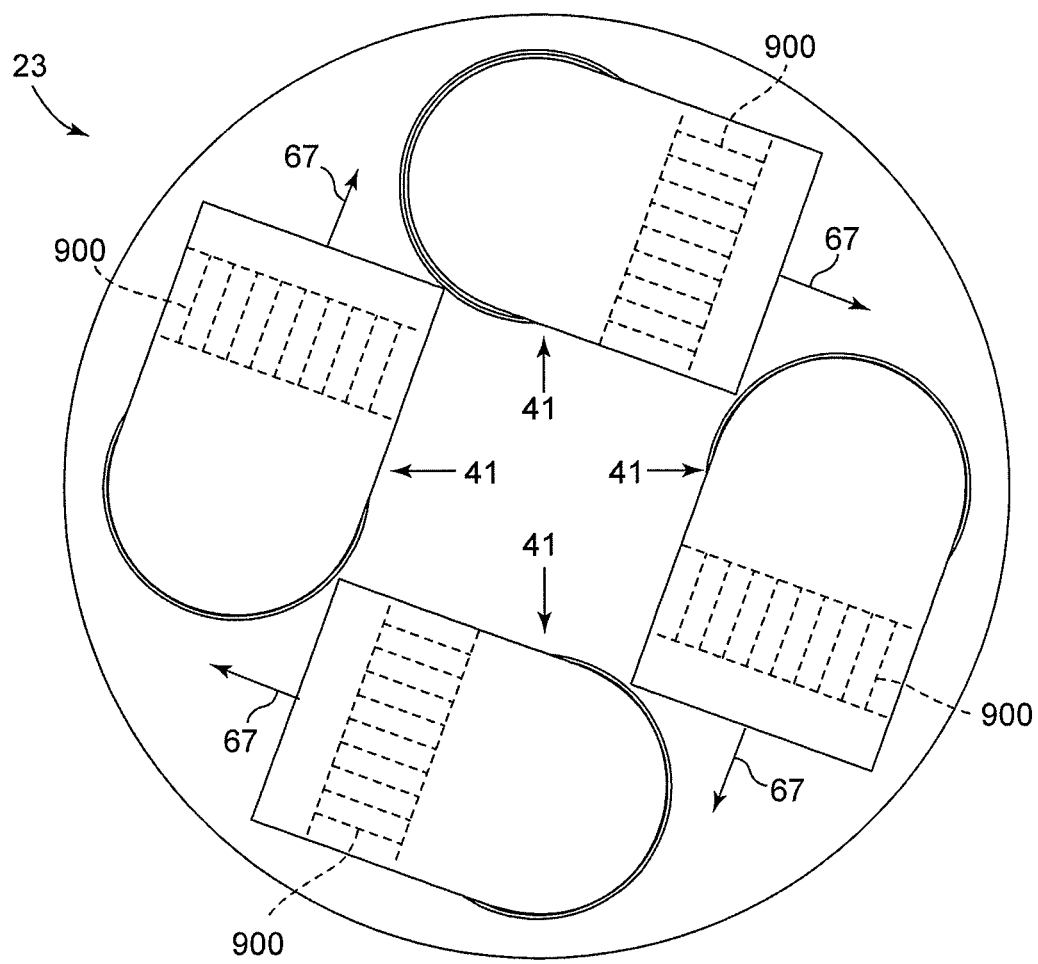
FIG. 19 is a view showing the flow device of FIG. 2 including catalyzed substrates for catalyzing a desired chemical reaction at the flow device.

In certain embodiments, additional structures may be added to the flow devices to facilitate incorporating a catalyst into the flow devices. For example, a thin-sheet or sheets of alumina-titanate may be placed on all areas and/or some areas of the flow device to apply hydrolysis catalyst. Alternatively, perforated baffles coated with a wash coat having a hydrolysis catalyst can be incorporated into high flow areas of the flow device (e.g., within the bent tubes). In a further embodiment, as shown at FIG. 19, mini-substrates 900 coated with wash coat having a hydrolysis catalyst are provided in each of the bent tubes 41 of the flow device 23. It will be appreciated that each of the mini-substrates can have a flow-through configuration of the type described above with respect to catalytic converters.

To enhance the vaporization of reactant, flow devices in accordance with the principles of the present disclosure can also include structures that enhance the transfer of heat to the reactant within the flow device. For example, heat transfer fins can be provided within the flow device (e.g., within the bent tubes) to provide increased surface area for transferring heat to the reactant passing through the flow device.

Figure 20:
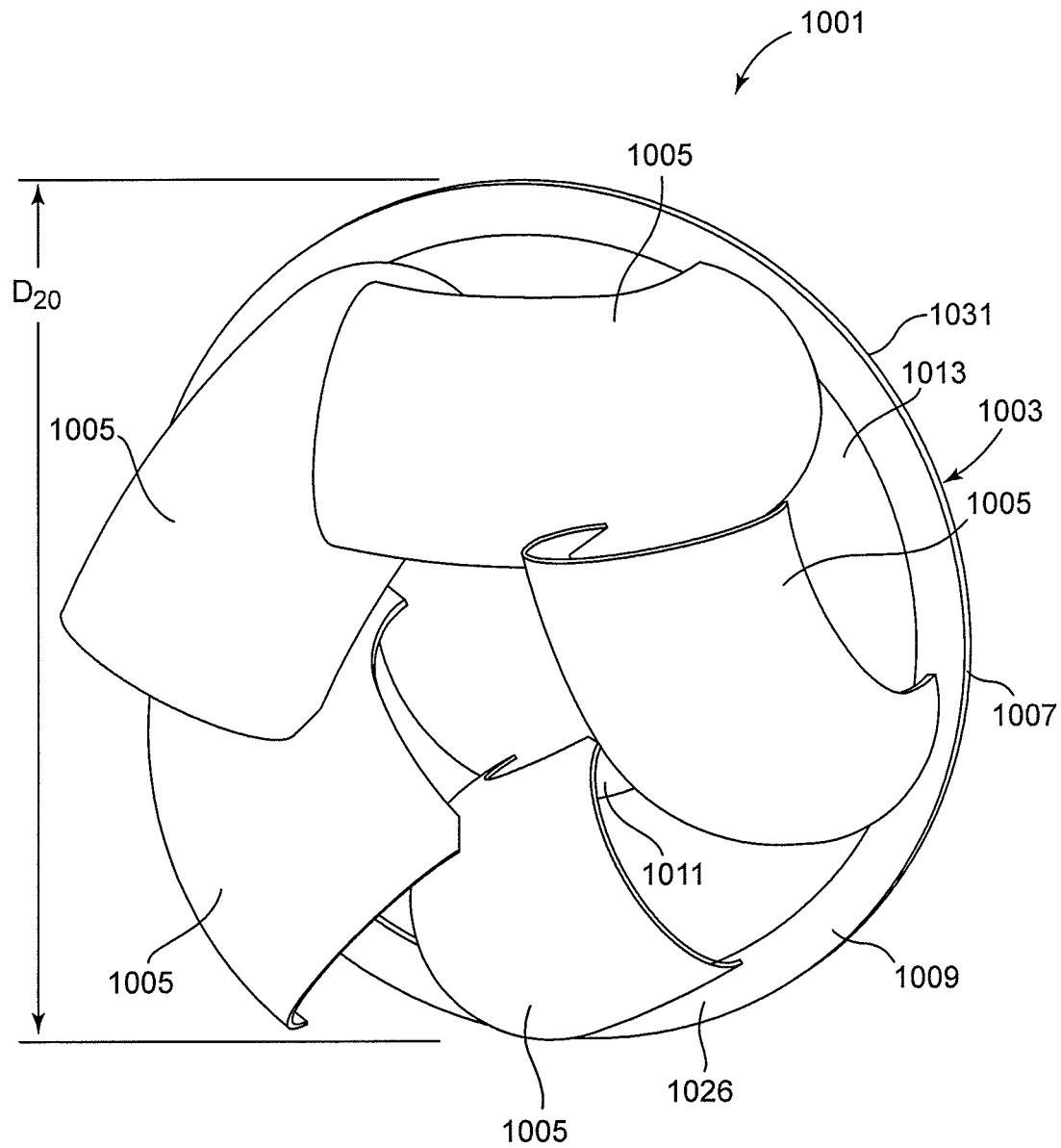
FIG. 20 is a perspective view of an alternate embodiment of a flow device suitable for use in the engine exhaust system of FIG. 1.

Referring now to FIG. 20, an alternate embodiment of a flow device 1001 will be described. The flow device 1001 includes a base member, generally designated 1003, and a plurality of flow deflectors, generally designated 1005. In the subject embodiment, the base member 1003 has an outer circumferential surface 1007 having a diameter $D_{20}$. The diameter $D_{20}$ is sized such that when the base member 1003 is disposed in the housing assembly 27, the outer circumferential surface 1007 of the base member 1003 substantially blocks the flow of exhaust between the outer circumferential surface 1007 and the housing assembly 27. In the subject embodiment, the outer circumferential surface 1007 of the base member 1003 is mounted (e.g., spot welded, etc.) to the inner diameter of the housing assembly 27.

The base 1003 includes an outer ring 1009 and a center section 1011 disposed within the outer ring 1009. In the subject embodiment, the outer ring 1009 includes an inner diameter that is greater than an outer diameter of the center section 1011. As a result of this difference between the inner diameter of the outer ring 1009 and the outer diameter of the center section 1011, the outer ring 1009 and the center section 1011 cooperatively define a pathway 1013 when the outer ring 1009 and the center section 1011 are axially aligned. The size of the pathway 1013 affects the amount of pressure required for flow to pass through the pathway 1013. As the size of the pathway 1013 increases, the amount of pressure required for flow to pass through the pathway 1013 decreases.

Figure 21:
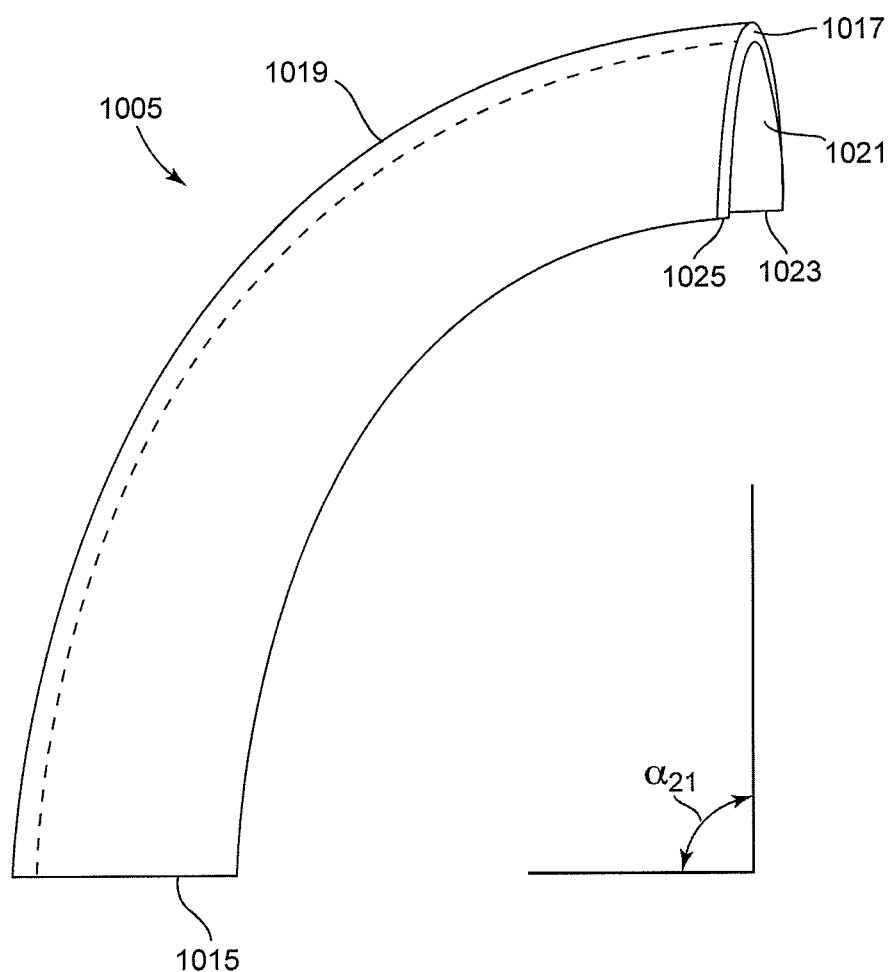
FIG. 21 is a perspective view of an alternate embodiment of a flow deflector suitable for use with the flow device of FIG. 20.
Figure 22:
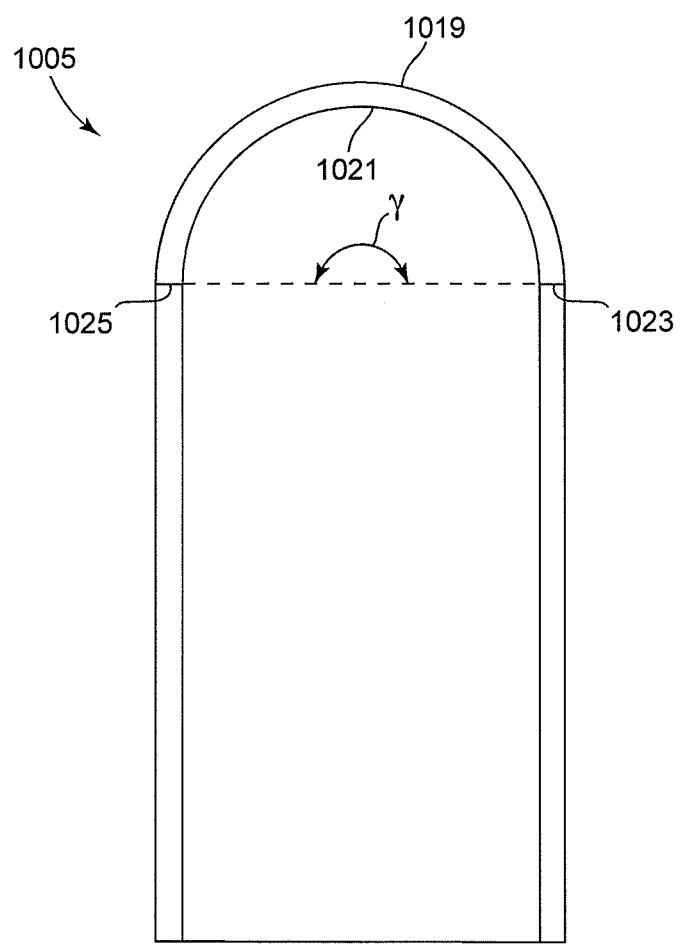
FIG. 22 is a side view of the flow deflector of FIG. 21.
Figure 23:
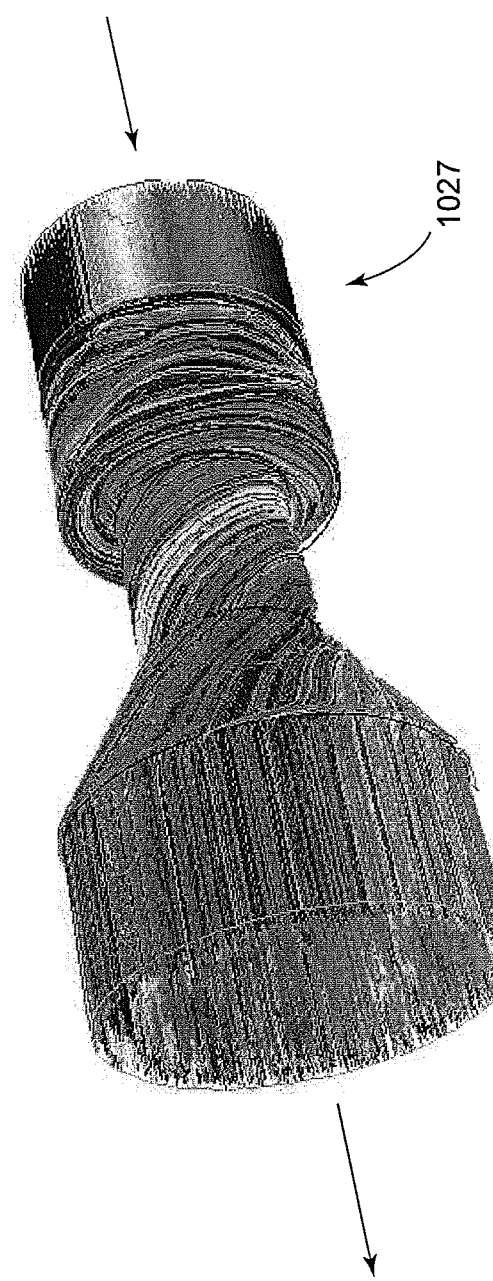
FIG. 23 is a perspective view of a flow path through the flow device of FIG. 20.

Referring now to FIGS. 20-22, the flow deflectors 1005 will be described. The flow deflectors 1005 include a first end 1015 and a second end 1017. Each flow deflector 1005 has an arcuate configuration such that the second end 1017 is oriented at an angle $\alpha_{21}$ from the first end 1015. The terms "angle" and "angled" as used to describe the configuration of the second end 1017 with respect to the first end 1015 of the flow deflector 1005 in the disclosure and in the appended claims means any angle, which is measured as shown in FIG. 21 by reference symbol $\alpha_{21}$, other than 0 or 180 degrees unless otherwise limited. In one embodiment, the angle $\alpha_{21}$ is a range of about 45 degrees to about 135 degrees, about 60 degrees to about 120 degrees, about 70 degrees to about 110 degrees, or about 80 degrees to about 100 degrees. In another embodiment, the angle $\alpha_{21}$ is about 90 degrees.

The flow deflector 1005 includes an outer surface 1019 and an inner surface 1021. In the subject embodiment, the inner surface 1021 is a concave surface that faces toward the pathway 1013 when assembled onto the base member 1003. The concavity of the inner surface 1021 of the flow deflector 1005 extends between a first side 1023 and a second side 1025. In the subject embodiment, the concavity of the inner surface 1021 forms a partial circle. In the depicted embodiment, the partial circle is a semi-circle. By having the concavity of the inner surface 1021 form a partial circle, more flow deflectors 1005 can be positioned about the base member 1003 and therefore better direct the flow through the base member 1003.

In the depicted embodiment, the first end 1015 of the flow deflector 1005 is connectedly engaged with an outlet side 1026 of the outer ring 1009 and the center section 1011. In the subject embodiment, the flow deflector 1005 is oriented on the base member 1003 such that the outer ring 1009 and the center section 1011 are connected by the first end 1015 of the flow deflector 1005 at the outlet side 1026 of the base member 1003. It will be understood, however, that the scope of the present disclosure is not limited to the outer ring 1009 and the center section 1011 being connected by the flow deflector 1005 as radial arms could extend between the outer ring 1009 and the center section 1011. In one embodiment, the first end 1015 of the flow deflector 1005 is mechanically connected (e.g., welded, spot welded, riveted, bonded, etc.) to the outer ring 1009 and the center section 1011.

Referring now to FIGS. 11, 20, 23, and 24, an exemplary flow path 1027 through the exhaust treatment system 319 is shown. Flow enters the inlet portion 371 of the housing assembly 327. The direction of flow path 1027 at the inlet portion 371 is generally parallel to a longitudinal axis 1029 of the housing assembly 327. The flow passes through the catalytic converter 377 and the diesel particulate filter 379 and enters an inlet side 1031 of the base member 1003 of the flow device 1001. In the depicted embodiment, the doser 321 is disposed to the left of the mixing plane 369 of the flow device 1001 and injects reactants into the exhaust.

Figure 24:
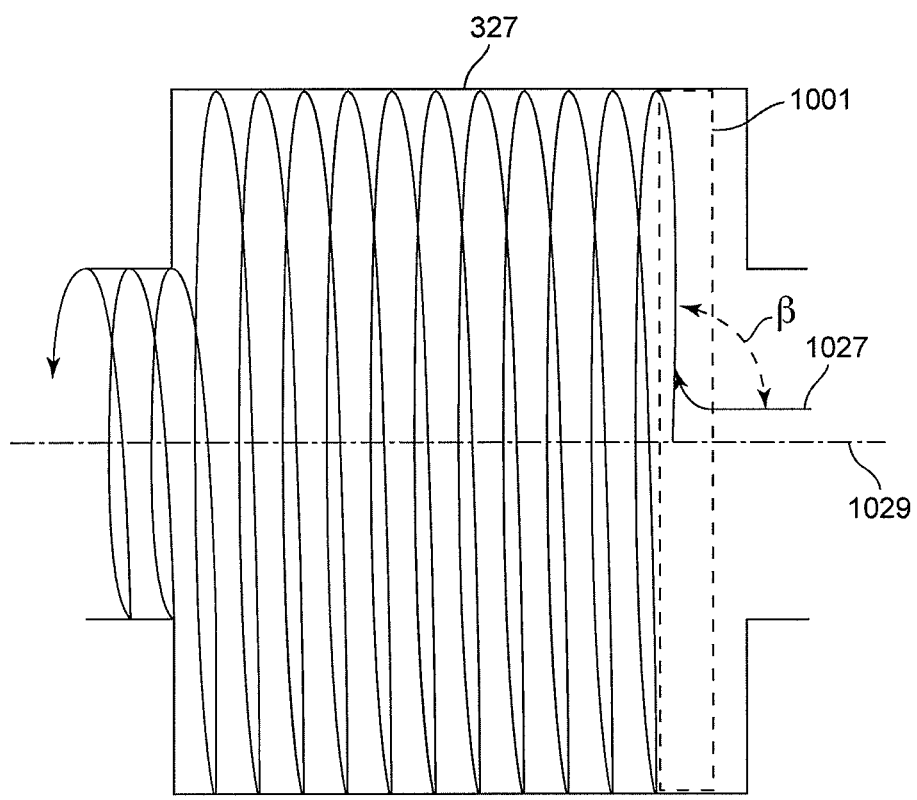
FIG. 24 is a schematic representation of the flow path through the flow device of FIG. 20.

As flow passes through the pathway 1013, the flow path 1027 is redirected by the flow deflectors 1005 such that the flow path 1027 circulates or swirls about the longitudinal axis 1029 of the housing assembly 327. In the subject embodiment, the longitudinal axis 1029 of the housing assembly 327 is generally coaxial with the longitudinal axis of the flow device 1001. The flow path 1027 is redirected in accordance with a flow redirection angle β (shown only in FIG. 24) that is measured from the direction of the flow entering the inlet side 1031 of the base member 1003 of the flow device 1001. The term "flow redirection angle" as used to describe the flow path 1027 through the flow device 1001 in the disclosure and in the appended claims will be understood as being measured in accordance with the reference symbol β as shown in FIG. 24. In one embodiment, the flow redirection angle β is in the range of about 45 degrees to about 135 degrees, about 60 degrees to about 120 degrees, about 70 degrees to about 110 degrees, or about 80 degrees to about 100 degrees. In another embodiment, the flow redirection angle β is about 90 degrees. In another embodiment, the flow redirection angle β is less than or equal to about 135 degrees, less than or equal to about 120 degrees, less than or equal to about 110 degrees, less than or equal to about 100 degrees, less than or equal to about 90 degrees, less than or equal to about 80 degrees, less than or equal to about 70 degrees, less than or equal to about 60 degrees, or less than or equal to about 45 degrees.

In the subject embodiment, the redirection of the flow in accordance with the flow redirection angle β provides a number of advantages. One potential advantage is that the flow path 1027 through the housing assembly 327 reduces or eliminates voids or areas of cavitation. Voids or areas of cavitation decrease the efficiency of the exhaust treatment system 319 since these voids or areas of cavitation serve as locations for unvaporized or unhydrolyzed reactants to collect. As these voids or areas of cavitation are not in contact with the exhaust, the reactants disposed in these locations remain unvaporized or unhydrolyzed. Therefore, by providing an exhaust treatment system 319 that reduces or eliminates voids or cavitation areas, the efficiency of the exhaust treatment system 319 is increased.

Another potential advantage of the redirection of the flow in accordance with the flow redirection angle β concerns the temperature distribution across the housing assembly 327. Voids or areas of cavitation in the housing assembly 327 create cold spots or areas of decreased temperature as compared to other areas along the flow path of the exhaust. Due to the effects of temperature on the reactivity of reactants, temperature variations can have a negative effect on the performance of exhaust treatment systems. However, as the flow path 1027 in the exhaust treatment system 319 reduces or eliminates these voids or areas of cavitation, the temperature distribution across the housing assembly 327 is relatively uniform, which provides improved performance.

Figure 25:
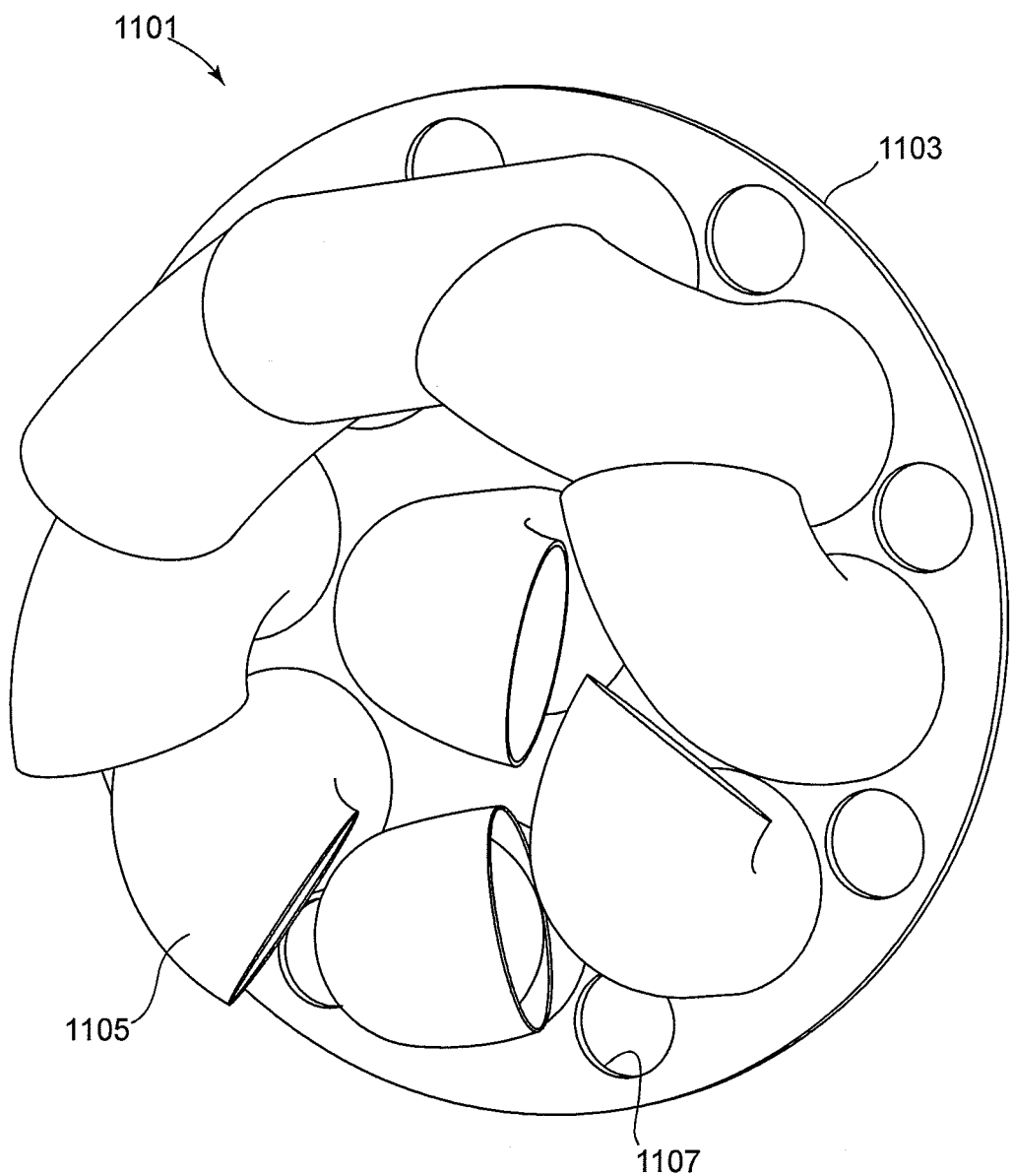
FIG. 25 is a perspective view of an alternate embodiment of a flow device suitable for use in the engine exhaust system of FIG. 1.

Referring now to FIG. 25, an alternate embodiment of a flow device 1101 will be described. The flow device 1101 includes a base member, generally designated 1103, and a plurality of flow deflectors, generally designated 1105. In the subject embodiment, the flow deflectors 1105 are disposed about the periphery of the base member 1103. The flow device 1101 also includes one flow deflector 1105 disposed at the center of the base member 1103.

The base member 1103 defines a plurality of holes 1107 that extend through the base member 1103. In the subject embodiment, each hole 1107 is disposed adjacent to one of the flow deflectors 1105. The holes 1107 through the base member 1103 provide a passageway for flow through the base member 1103 without passing through one of the flow deflectors 1105. The number and size of the holes 1107 impact the amount of pressure required for flow to pass through flow device 1101. As the size of each of the holes 1107 increases, the amount of pressure required for flow to pass through the flow device 1101 decreases. As the number of holes 1107 increases, the amount of pressure required for flow to pass through the flow device 1101 decreases.

Figure 26:
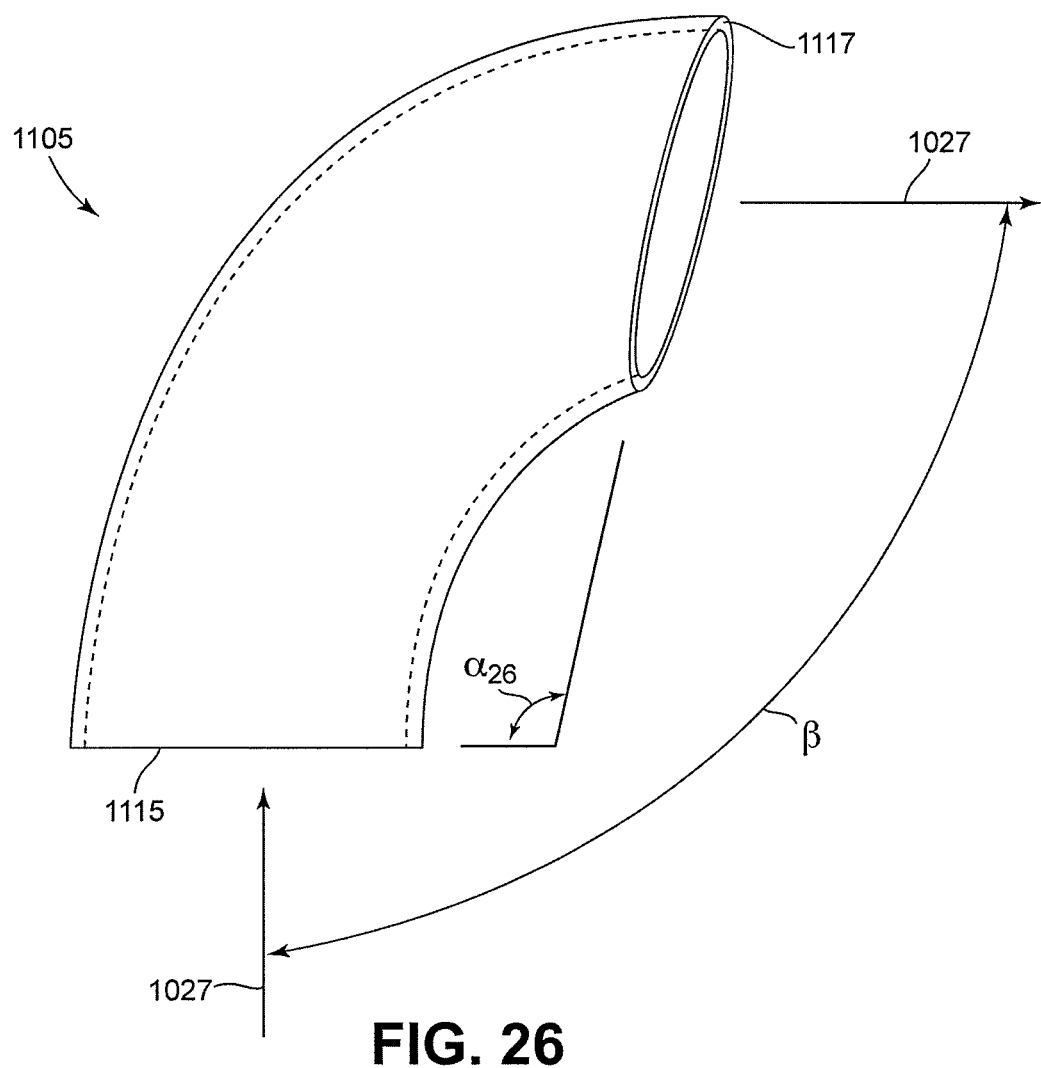
FIG. 26 is a perspective view of an alternate embodiment of a deflector suitable for use with the flow device of FIG. 25.

Referring now to FIG. 26, an alternate embodiment of a deflector 1105 will be described. The deflectors 1105 include a first end 1115 and a second end 1117. Each flow deflector 1105 has an arcuate configuration such that the second end 1117 is oriented at an angle $\alpha_{26}$ from the first end 1115. In the subject embodiment, the angle $\alpha_{26}$ is greater than 90 degrees. However, in the subject embodiment, while the second end 1117 is oriented at an angle $\alpha_{26}$ that is more than 90 degrees from the first end 1115, the flow redirection angle β of the deflector 1105 is about 90 degrees. In the depicted embodiment, the orientation of the second end 1117 assists in having more deflectors 1105 disposed about the periphery of the base member 1103 as the angle $\alpha_{26}$ of the second end 1117 reduces or eliminates interference between deflectors 1105. The greater the angle $\alpha_{26}$ the closer the deflectors 1105 can be relative to one another.

Figure 28:
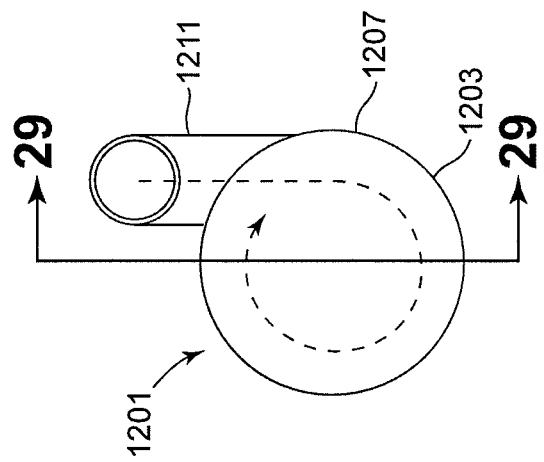
FIG. 28 is left side view of the housing assembly of FIG. 27.
Figure 27:
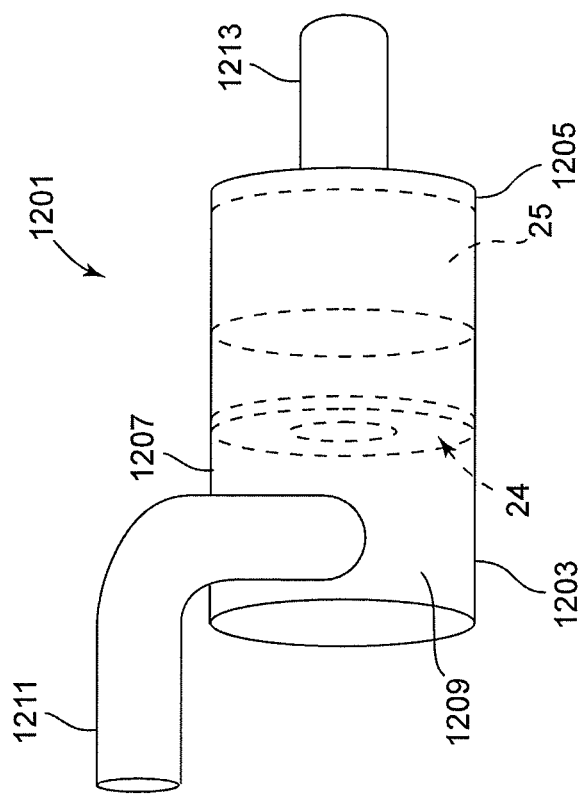
FIG. 27 is a perspective view of an alternate embodiment of a housing assembly suitable for use with the engine exhaust system of FIG. 1.
Figure 29:
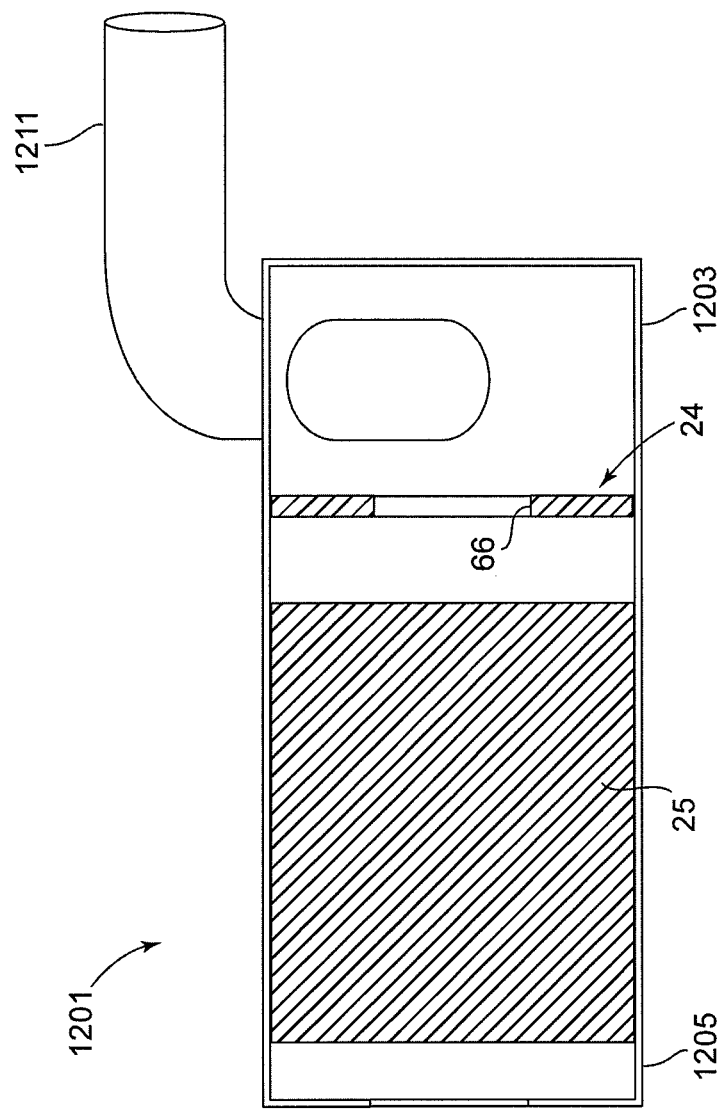
FIG. 29 is a cross-sectional view of the housing assembly of FIG. 27 taken on line 29-29 of FIG. 28.

Referring now to FIGS. 27-29, an alternate embodiment of a housing assembly 1201 is shown. The housing assembly 1201 includes a first axial end portion 1203 and an oppositely disposed second axial end portion 1205. The housing assembly 1201 further includes an outer surface 1207 and defines an inner cavity 1209.

Disposed within the inner cavity 1209 of the housing assembly 1201 are the baffle 24 and the aftertreatment device 25. An inlet tube 1211, which is disposed at the first axial end portion 1203 of the housing 1201, and an outlet tube 1213, which is disposed at the second axial end portion 1205, are in fluid communication with the inner cavity 1209 of the housing assembly 1201.

The inlet tube 1211 is in fluid communication with the inner cavity 1209 through the outer surface 1207 of the housing assembly 1205 at the first axial end portion 1203. As best shown in FIG. 28, the inlet tube 1211 is generally tangent to outer surface 1207 of the housing assembly 1205. The tangential interface between the inlet tube 1211 and the outer surface 1207 of the housing assembly 1201 is adapted to redirect the exhaust flow such that the exhaust flow swirls circumferentially about a longitudinal axis 1215 of the housing assembly 1201. As the exhaust mixture enters the inner cavity 1209 of the housing assembly 1205 through the inlet tube 1211, the exhaust mixture swirls within the inner cavity 1209. The exhaust mixture then passes through the passage 66 of the baffle 24 to the aftertreatment device 25.

As the exhaust mixture swirls within the inner cavity 1209 prior to passing through the passage 66 of the baffle 24, the reactants that are dispensed into the exhaust by the doser 21 (shown schematically in FIG. 8) are mixed into the exhaust. In addition, unvaporized and/or unhydrolyzed reactants are pushed toward the wall of the housing assembly 1201 by centrifugal forces. As previously described, the body 68 of the baffle 24 prevents the reactants disposed against the wall of the housing assembly 1201 from flowing in an axial direction to the aftertreatment device 25. After the reactants vaporize, however, the reactants can flow through the passage 66 to the aftertreatment device 25.

The subject embodiment of the housing assembly 1201 is potentially advantageous as it is compact. As the swirling motion of the exhaust mixture is accomplished as a result of the generally tangential interface between the inlet tube 1211 and the outer surface 1207 of the housing assembly 1205, less space is needed within the inner cavity 1209 to mix reactants.

Referring now to FIGS. 30 and 31, an alternate embodiment of a housing assembly 1301 is shown. The housing assembly 1301 includes a first axial end 1303 and an oppositely disposed second axial end 1305. The housing assembly 1301 further includes an inner cavity 1307.

Disposed within the inner cavity 1307 of the housing assembly 1301 are the baffle 24 and the aftertreatment device 25. An inlet tube 1311 is engaged with the housing assembly 1301 at the first axial end 1303 while an outlet tube 1313 is engaged with the second axial end 1305.

In the subject embodiment, the inlet tube 1311 is disposed at an outer portion of the first axial end 1303. The inlet tube 1311 includes a first end 1315 and a second end 1317. The second end 1317 extends through the first axial end 1303 into the inner cavity 1307. In the inner cavity 1307, the inlet tube 1311 redirects the flow through the inlet tube 1311 such that exhausts gases circumferentially swirl about a longitudinal axis 1319 of the housing assembly 1301. In the subject embodiment, the exhaust gases exiting the second end 1317 are disposed at a swirl angle $\alpha_{30}$, where the swirl angle $\alpha_{30}$ is defined as the angle between a velocity vector 1321 of the exhaust gases and an axial direction 1323. In one embodiment, and by way of example only, the swirl angle $\alpha_{30}$ is in the range of about 45 degrees to about 135 degrees. In another embodiment, the swirl angle $\alpha_{30}$ is in the range of about 60 degrees to about 100 degrees.

Figure 32:
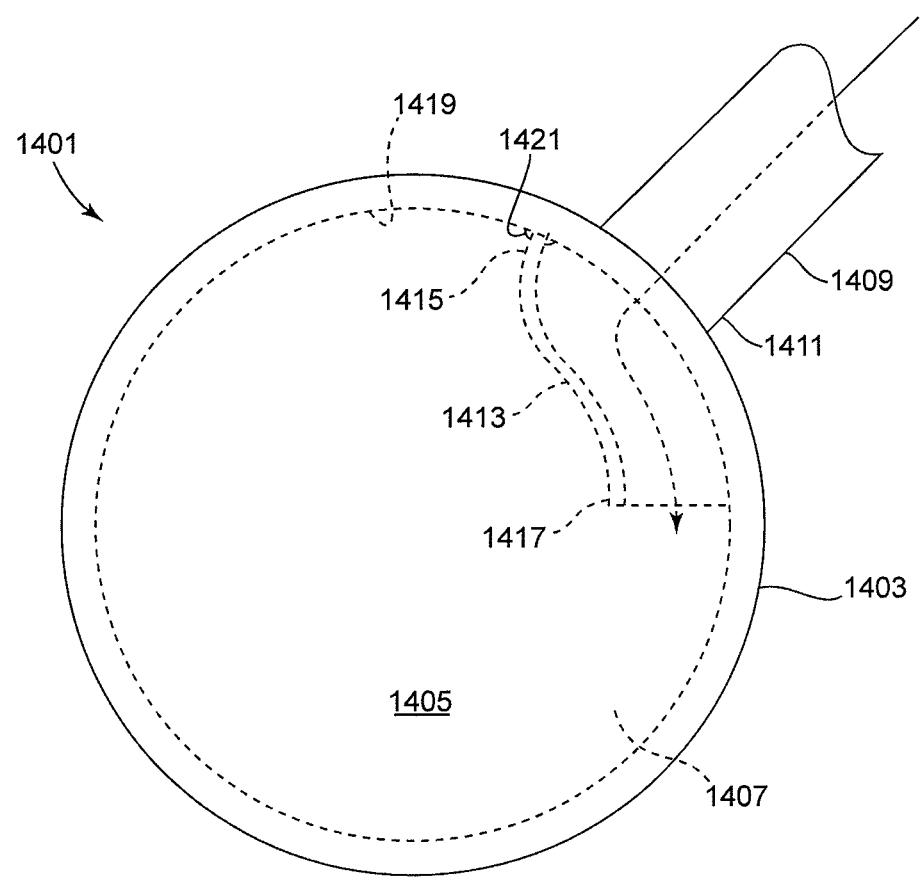
FIG. 32 is a left side view of an alternate embodiment of a housing assembly suitable for use with the engine exhaust system of FIG. 1.

Referring now to FIG. 32, an alternate embodiment of a housing assembly 1401 is shown. The housing assembly 1401 includes a main body 1403 having a first axial end 1405 and an inner cavity 1407. Disposed within the inner cavity 1407 of the housing assembly 1401 are the baffle 24 and the aftertreatment device 25.

An inlet tube 1409 is engaged with an outer portion of the main body 1403 at the first axial end 1405 while an outlet tube (not shown) is engaged with a second axial end of the main body 1403. The inlet tube 1409 includes a first end portion 1411 that is radially engaged with the housing assembly 1401.

A flow device 1413 is disposed in the inner cavity 1407 of the housing assembly 1401. In the subject embodiment, the flow device 1413 is a tube that includes an inlet end 1415 and an outlet end 1417. The flow device 1413 is fixed to an inner wall 1419 of the housing assembly 1401 such that the inlet end 1415 of the flow device 1413 receives exhaust gases from the inlet tube 1409. In the depicted embodiment of FIG. 32, a weld 1421 fixes the flow device 1413 to the inner wall 1419 of the housing assembly 1401.

The flow device 1411 redirects the direction of the exhaust gases from the inlet tube 1407 such that the exhaust gases flow circumferentially about a longitudinal axis of the main body 1403. In the subject embodiment, the exhaust gases exiting the outlet end 1417 are disposed at the swirl angle $\alpha_{30}$. In one embodiment, and by way of example only, the swirl angle $\alpha_{30}$ is in the range of about 45 degrees to about 135 degrees.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An exhaust treatment system comprising:
    an exhaust conduit for conveying exhaust gases from an engine of a vehicle along a flow path;
    an aftertreatment device disposed in the exhaust conduit;
    a flow device disposed in the flow path upstream of the aftertreatment device, the flow device including an inlet and an outlet and defining an exhaust flow redirection angle measured between the inlet and the outlet for redirecting exhaust flow through the flow device such that the exhaust flow swirls about a longitudinal axis of the flow device;
    a diameter restriction disposed between the flow device and the aftertreatment device and downstream of the outlet of the flow device, the diameter restriction being defined by a passage through a baffle body disposed in the conduit, the diameter restriction restricting the flow path by 0.15 to 0.45;
    a doser adapted for injecting reactants into the exhaust gases, wherein the doser is disposed upstream of the diameter restriction;
    wherein the baffle body is sized and shaped to inhibit passage of the injected reactants in the swirling exhaust flow through the diameter restriction until the injected reactants are vaporized or hydrolyzed, and wherein the baffle body is sized and configured to enable passage of vaporized or hydrolyzed reactants through the diameter restriction to the aftertreatment device;
    wherein all of the exhaust gases from the engine encounter the diameter restriction.

2. An exhaust treatment system as claimed in claim 1, wherein the aftertreatment device is a selective catalytic reduction catalyst device.

3. An exhaust treatment system as claimed in claim 1, wherein the aftertreatment device includes two selective catalytic reduction catalyst devices.

4. An exhaust treatment system as claimed in claim 1, further comprising a catalytic converter disposed upstream of the flow device.

5. An exhaust treatment system as claimed in claim 4, further comprising a diesel particulate filter disposed between the catalytic converter and the flow device.

6. An exhaust treatment system as claimed in claim 1, wherein the aftertreatment device is a lean NOx catalyst device.

7. The exhaust treatment system as claimed in claim 1, wherein the flow device includes:
    a base; and
    a plurality of flow deflectors disposed on the base, wherein the flow deflectors define the exhaust redirection angle.

8. The exhaust treatment system as claimed in claim 7, wherein the flow deflectors are arcuate in shape.

9. The exhaust treatment system as claimed in claim 7, wherein each flow deflector is a tube defining a passageway through the tube.

10. The exhaust treatment system as claimed in claim 7, wherein the base defines a plurality of holes disposed adjacent to the flow deflectors.

11. The exhaust treatment system as claimed in claim 10, wherein the flow deflectors are welded to a lip surrounding the plurality of holes of the base.

12. The exhaust treatment system as claimed in claim 10, wherein there are four flow deflectors and four holes in the base with each deflector disposed in one of the holes in the base.

13. The exhaust treatment system as claimed in claim 7, wherein the flow deflector includes an inner surface that is concave.

14. The exhaust treatment system of claim 7, further comprising a catalyst provided at at least one of the base and the deflectors.

15. The exhaust treatment system of claim 14, wherein the catalyst includes a hydrolysis catalyst.

16. The exhaust treatment system of claim 14, further comprising a structure secured to the at least one of the base and the deflectors for supporting the catalyst.

17. The exhaust treatment system of claim 16, wherein the structure includes a flow-through substrate provided within the deflectors.

18. The exhaust treatment system of claim 14, wherein at least one of the base and the deflectors includes at least portions coated with a wash coat including the catalyst.

19. The exhaust treatment system as claimed in claim 1, wherein the doser is disposed upstream of a mixing plane defined by the flow device.

20. The exhaust treatment system as claimed in claim 19, wherein the doser injects urea into the exhaust gases from the engine.

21. The exhaust treatment system as claimed in claim 19, wherein the doser injects ammonia into the exhaust gases from the engine.

22. An exhaust treatment system as claimed in claim 19, wherein the doser injects ammonia into the exhaust gases from the engine.

23. The exhaust treatment system as claimed in claim 1, wherein the exhaust flow redirection angle is 70 degrees to 110 degrees.

24. The exhaust treatment system as claimed in claim 1, wherein the exhaust flow redirection angle is 80 degrees to 100 degrees.

25. The exhaust treatment system as claimed in claim 1, wherein the exhaust flow redirection angle is 90 degrees.

26. The exhaust treatment system as claimed in claim 1, wherein the exhaust flow redirection angle is 45 degrees to 135 degrees.

27. The exhaust treatment system as claimed in claim 1, wherein the diameter restriction includes a plate having an opening through which the exhaust flow passes.

28. The exhaust treatment system as claimed in claim 27, wherein the plate is arranged perpendicular to the exhaust conduit.

29. The exhaust treatment system as claimed in claim 1, wherein the aftertreatment device is a selective catalytic reduction device.

* * * * *